(12) United States Patent
Xi et al.

(10) Patent No.: US 10,469,868 B2
(45) Date of Patent: Nov. 5, 2019

(54) MOTION ESTIMATION AND IN-LOOP FILTERING METHOD AND DEVICE THEREOF

(71) Applicant: Intel Corporation, Santa Clara, CA (US)

(72) Inventors: Yinglai Xi, Beijing (CN); Qiang Li, Beijing (CN); Jumei Li, Beijing (CN); Jianbin He, Beijing (CN); Jinfeng Zhou, Beijing (CN); Zhichong Chen, Beijing (CN); Liu Yang, Beijing (CN); Dong Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 14/818,886

(22) Filed: Aug. 5, 2015

(65) Prior Publication Data

US 2015/0341658 A1 Nov. 26, 2015

Related U.S. Application Data

(62) Division of application No. 13/777,434, filed on Feb. 26, 2013, now abandoned.

(30) Foreign Application Priority Data

Feb. 27, 2012 (CN) .......................... 2012 1 0046566

(51) Int. Cl.
*H04N 19/547* (2014.01)
*H04N 19/117* (2014.01)
(Continued)

(52) U.S. Cl.
CPC ......... *H04N 19/547* (2014.11); *H04N 19/117* (2014.11); *H04N 19/122* (2014.11);
(Continued)

(58) Field of Classification Search
CPC ...... H04N 19/82; H04N 19/139; H04N 19/86; H04N 19/61; H04N 19/80; H04N 19/176; G06T 5/20
(Continued)

(56) References Cited

U.S. PATENT DOCUMENTS

2003/0044080 A1* 3/2003 Frishman ................. G06T 5/20
382/268
2004/0017515 A1* 1/2004 Lange ................. H04N 19/176
348/607
(Continued)

FOREIGN PATENT DOCUMENTS

| CN | 101715127 A | 5/2010 | |
|---|---|---|---|
| CN | 101742292 A | 6/2010 | |
| WO | WO 2011142603 A2 * | 11/2011 | ............. H04N 19/86 |

OTHER PUBLICATIONS

Office Action dated Jul. 5, 2016 for Chinese Patent Application No. 201410012310.5.

*Primary Examiner* — Jorge L Ortiz Criado
*Assistant Examiner* — Daniel Chang
(74) *Attorney, Agent, or Firm* — Schiff Hardin LLP

(57) ABSTRACT

An in-loop filtering acceleration circuit applied in a video codec system supporting the H.264 standard and the VC-1 standard is provided. The circuit includes multiple one-dimensional (1D) filters configured to perform a filtering process; and a filter selection unit configured to select one of the 1D filters according to the value of the boundary strength to perform the filtering processing to the reconstructed macroblock. The in-loop filtering acceleration circuit further divides the reconstructed macroblock into multiple 8×8 blocks and multiple 4×4 blocks, performs the filtering process to horizontal edges of the 8×8 blocks the reconstructed macroblock row by row from bottom to top, and performs (Continued)

the filtering process to horizontal edges of the 4×4 blocks row by row from top to bottom.

17 Claims, 26 Drawing Sheets

(51) Int. Cl.
*H04N 19/122* (2014.01)
*H04N 19/56* (2014.01)
*H04N 19/50* (2014.01)
*H04N 19/82* (2014.01)
*H04N 19/433* (2014.01)
*H04N 19/533* (2014.01)
*H04N 19/523* (2014.01)

(52) U.S. Cl.
CPC ........... *H04N 19/433* (2014.11); *H04N 19/50* (2014.11); *H04N 19/56* (2014.11); *H04N 19/82* (2014.11); *H04N 19/523* (2014.11); *H04N 19/533* (2014.11)

(58) Field of Classification Search
USPC ............... 375/240.29, 240.24; 382/233, 268; 348/607
See application file for complete search history.

(56) References Cited

U.S. PATENT DOCUMENTS

| | | | |
|---|---|---|---|
| 2005/0013494 A1* | 1/2005 | Srinivasan | H04N 19/139 382/233 |
| 2006/0002477 A1* | 1/2006 | Bae | H04N 19/80 375/240.24 |
| 2006/0262990 A1 | 11/2006 | Lee et al. | |
| 2008/0056389 A1* | 3/2008 | Chiang | H04N 19/82 375/240.29 |
| 2008/0084932 A1 | 4/2008 | Wang et al. | |
| 2008/0137752 A1* | 6/2008 | He | H04N 19/139 375/240.29 |
| 2009/0016450 A1* | 1/2009 | Wang | H04N 19/61 375/240.29 |
| 2010/0296588 A1* | 11/2010 | Fujii | H04N 5/232 375/240.29 |

* cited by examiner

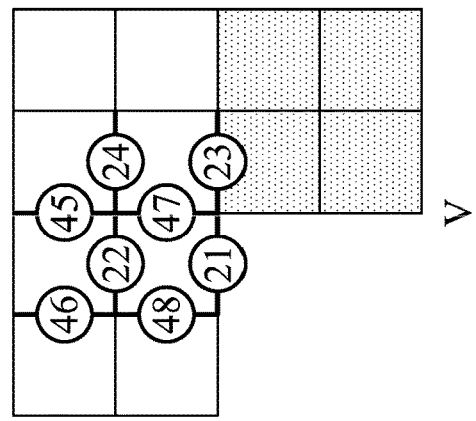
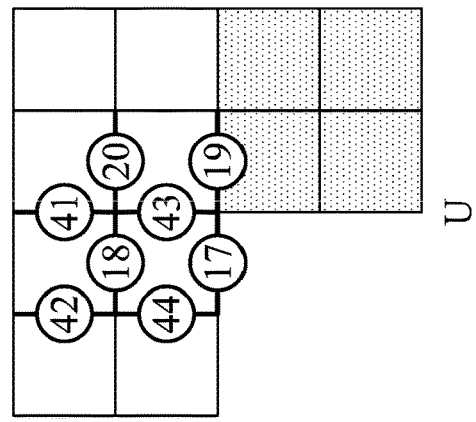
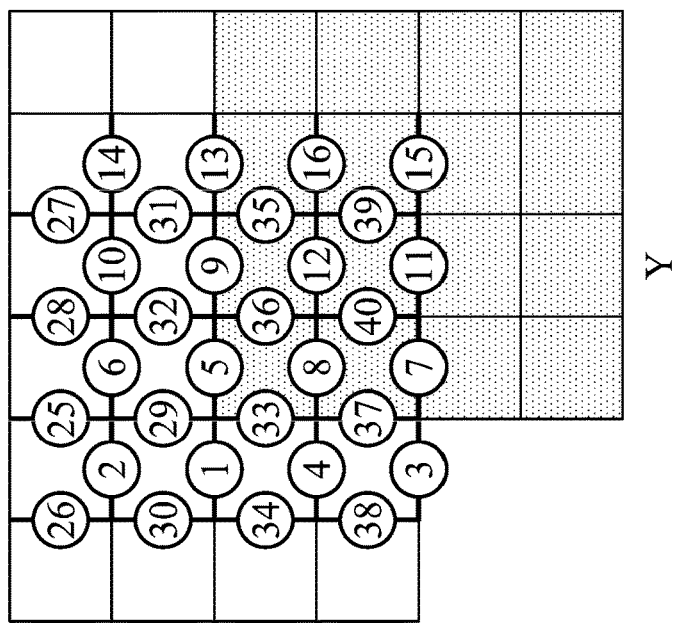
FIG. 11

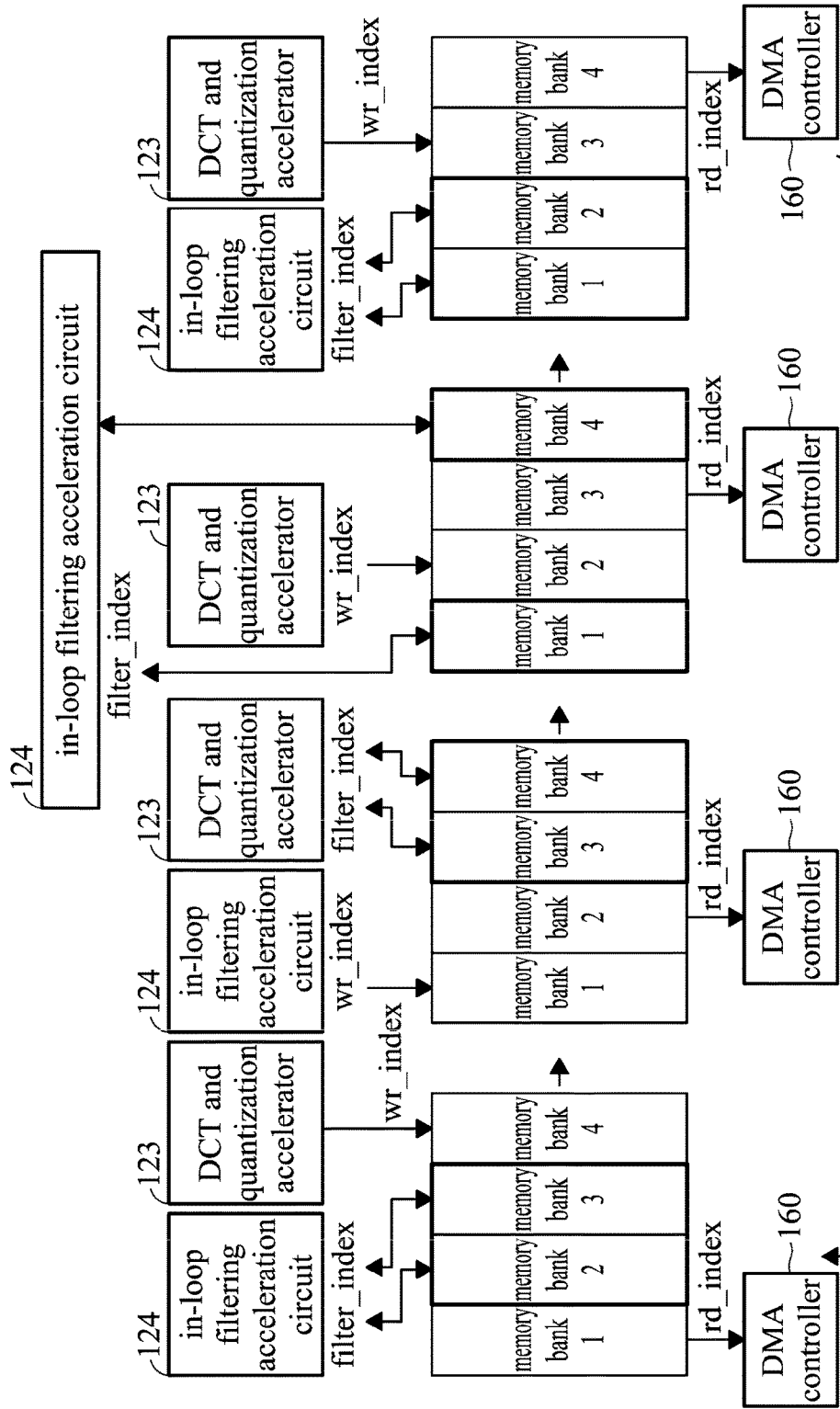

MOTION ESTIMATION AND IN-LOOP FILTERING METHOD AND DEVICE THEREOF

CROSS REFERENCE TO RELATED APPLICATIONS

This Application is a divisional of pending U.S. application Ser. No. 13/777,434, filed on Feb. 26, 2013, which claims priority of China Patent Application No. 201210046566.9, filed on Feb. 27, 2012, the entireties of which are incorporated by reference herein.

BACKGROUND OF THE INVENTION

Field of the Invention

The present invention relates to video processing, and in particular relates to a motion estimation acceleration circuit and in-loop filtering acceleration circuit by using data in the overlapped portions of neighboring macroblocks recursively to reduce memory bandwidth.

Description of the Related Art

Video compression standards, such as MPEG2, H.264 or VC-1 standards, have been widely used in the video codec (coding/decoding) systems on the market. However, in a video codec system, calculation of motion estimation and de-blocking filtering may have the largest amount of operations. If a video codec system performs motion estimation and de-blocking filtering by software only, it may cause a serious burden to the processing unit. In addition, when a conventional hardware circuit performs motion estimation and de-blocking filtering, some previously used macroblock data may be read from the external memory repeatedly, so that the memory bandwidth for accessing the external memory is wasted.

BRIEF SUMMARY OF THE INVENTION

In an exemplary embodiment, a motion estimation acceleration circuit applied in a video encoding system supporting multiple video codec standards is provided. The circuit comprises: a start searching point prediction unit, configured to determine a start searching point according to multiple neighboring macroblocks of a current macroblock, wherein the current macroblock corresponds to a searching window; and an integer pixel estimation unit, configured to determine a best candidate pixel according to a first line segment where the start searching point is located, a second line segment on the first line segment, and a third line segment beneath the first line segment, wherein the integer pixel estimation unit further determines whether the best candidate pixel is located at the first line segment, if so, the integer pixel estimation unit sets a candidate motion vector corresponding to the best candidate pixel as a first current macroblock motion vector; if not, the integer pixel estimation unit dynamically adjusts the second line segment or the third line segment in the searching window to update the best candidate pixel, and retrieve the first current macroblock motion vector corresponding to the updated best candidate pixel.

In another exemplary embodiment, a motion estimation method is provided. The method has the following steps of: determining a start searching point according to multiple neighboring macroblocks of a current macroblock, wherein the current macroblock corresponds to a searching window; determining a best candidate pixel according to a first line segment where the start searching point is located, and a second/third line segment on/beneath the first line segment; determining whether the best candidate pixel is located at the first line segment; if so, setting a candidate motion vector corresponding to the best candidate pixel as a first motion vector of the current macroblock; and if not, dynamically adjusting the second line segment or the third line segment in the searching window to update the best candidate pixel, and retrieving the first motion vector of the current macroblock corresponding to the updated best candidate pixel.

In yet another exemplary embodiment, an in-loop filtering acceleration circuit applied in a video codec system supporting the H.264 standard and the VC-1 standard is provided. The video codec system comprises a processing unit to perform video processing to generate at least one reconstructed macroblock and a value of boundary strength corresponding to each edge of the reconstructed macroblock. The in-loop filtering acceleration circuit comprises: multiple one-dimensional (1D) filters configured to perform a filtering process; and a filter selection unit configured to select one of the 1D filters according to the value of the boundary strength to perform the filtering processing to the reconstructed macroblock, wherein the in-loop filtering acceleration circuit further divides the reconstructed macroblock into multiple 8×8 blocks and multiple 4×4 blocks, performs the filtering process to horizontal edges of the 8×8 blocks, the reconstructed macroblock row by row according to a first predefined order, and performs the filtering process to horizontal edges of the 4×4 blocks row by row from top to bottom, wherein the in-loop filtering acceleration circuit further performs the filtering process to vertical edges of the 8×8 blocks column by column according to a second predefined order, and performs the filtering process to vertical edges of the 4×4 blocks column by column from left to right.

In yet another exemplary embodiment, an in-loop filtering method applied in an in-loop filtering acceleration circuit of a video codec system supporting the H.264 standard and the VC-1 standard is provided. The video codec system comprises a processing unit to perform video processing to generate at least one reconstructed macroblock and a value of boundary strength corresponding to each edge of the reconstructed macroblock. The method comprises the following steps of: dividing the reconstructed macroblock into multiple 8×8 blocks and multiple 4×4 blocks; selecting one of multiple 1D filters according to the value of the boundary strength to perform the filtering processing to the reconstructed macroblock; performing the filtering process to horizontal edges of the 8×8 blocks the reconstructed macroblock row by row according to a predefined order, and performing the filtering process to horizontal edges of the 4×4 blocks row by row from top to bottom; and performing the filtering process to vertical edges of the 8×8 blocks column by column according to another predefined order, and performing the filtering process to vertical edges of the 4×4 blocks column by column from left to right.

BRIEF DESCRIPTION OF THE DRAWINGS

The present invention can be more fully understood by reading the subsequent detailed description and examples with references made to the accompanying drawings, wherein:

FIG. 11 is a diagram illustrating the in-loop filtering sequence in the VC-1 standard according to an embodiment of the invention;

FIGS. 13A~13D are portions of a diagram illustrating the sequence of data accessing in the de-blocking filter buffer 145 according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A. System Architecture

Figure 1:
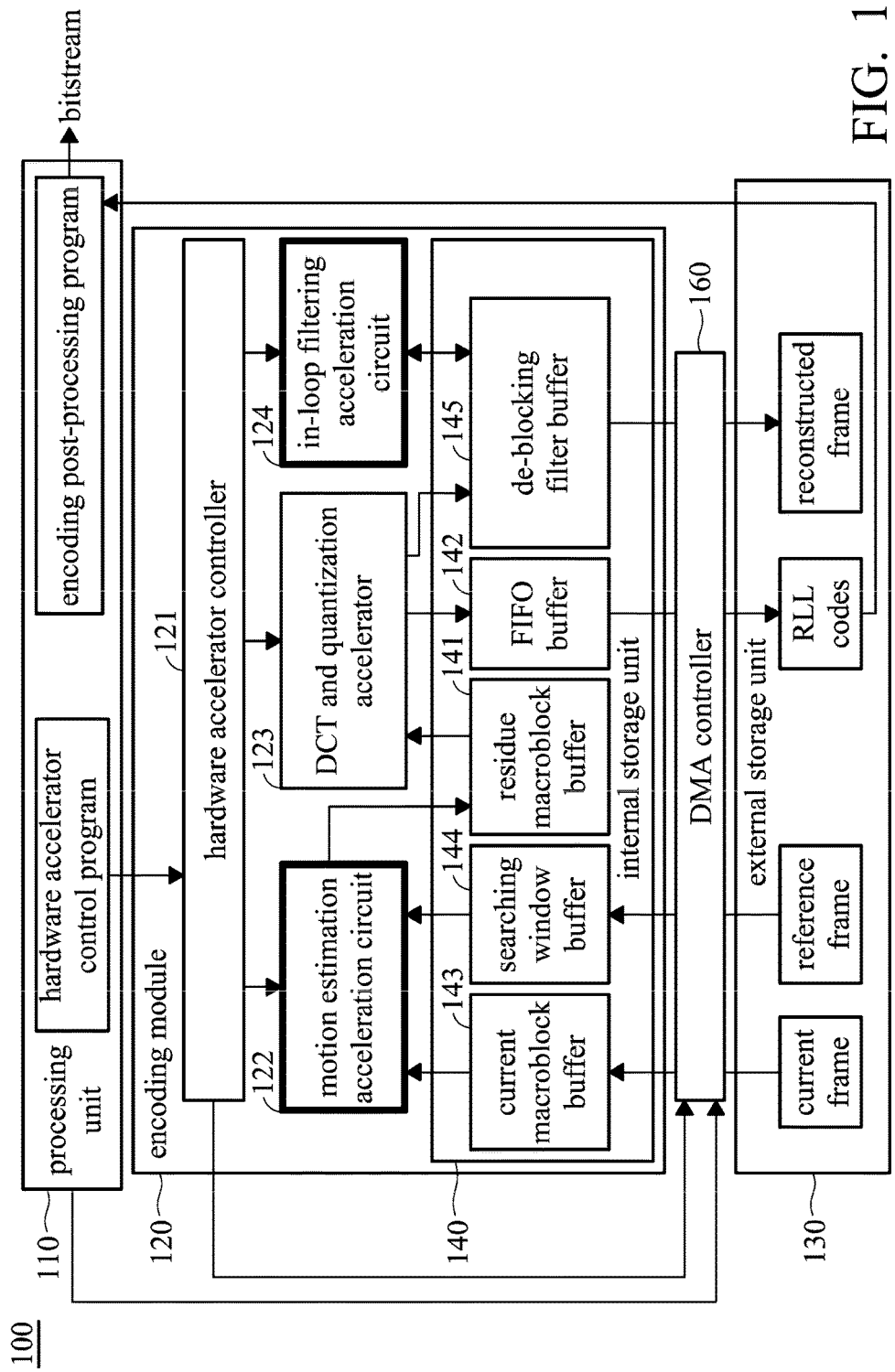
FIG. 1 is a block diagram illustrating a video encoding system according to an embodiment of the invention.

FIG. 1 is a block diagram illustrating a video encoding system according to an embodiment of the invention. The video decoding system 100 may comprise a processing unit 110, an encoding module 120, an external storage unit 130 and a DMA controller 160. During the video encoding procedure (e.g. MPEG2, H.263, and MPEG4 standards), the processing unit 110 may be a controller configured to execute a hardware accelerator control program, and execute an entropy encoding program, a bit rate control program, and a boundary extension program. For example, the processing unit 110 may be a central processing unit (CPU), a digital signal processor (DSP) or other equivalent circuits implementing the same functions.

The encoding module 120 may comprise a hardware accelerator controller 121, a motion estimation acceleration circuit 122, a DCT and quantization accelerator 123, an in-loop filtering acceleration circuit 124, and an internal storage unit 140. In an embodiment, the encoding module 120 can be divided into a hardware encoding unit and a software encoding unit (not shown in FIG. 1). That is, each component in the encoding module 120 may be implemented by hardware or a DSP (i.e. software) configured to perform encoding processes, such as motion estimation, motion compensation, discrete cosine transform/inverse transform (DCT/iDCT), quantization/inverse quantization, zig-zag scan, and in-loop filtering. However, the motion estimation acceleration circuit 122 and the in-loop filtering acceleration circuit 124 are dedicated digital logic circuits or hardware to implement encoding processes, such as motion estimation and in-loop filtering processing.

For ease of explanation, the hardware accelerator controller 121, the motion estimation acceleration circuit 122, the DCT and quantization accelerator 123, and the in-loop filtering acceleration circuit 124 in the encoding module 120 of FIG. 1 is implemented by hardware. The hardware components, such as the processing unit 110 and the encoding module 120, may utilize a frame level flow control method indicating that the CPU may decode the next frame when the hardware components of the encoding module 120 decodes the current frame. The data flow between each component (e.g. all hardware, or integrated by hardware/software) in the encoding module 120 may be macroblock level flow control. The external storage unit 130 is configured to store reference frames, reconstructed frames, decoding parameters, and run-last-level codes (i.e. RLL codes). For example, the external storage unit 130 may be a volatile memory component (e.g. random access memory, such as DRAM, SRAM) and/or a non-volatile memory component (e.g. ROM, hardware accelerator, CDROM). The DMA controller 160 is configured to retrieve macroblock data and encoding parameters corresponding to the encoding process. The hardware accelerator controller 121 in the encoding module 120 may read the required macroblock data (e.g. the current macroblock and reference macroblock) from the external storage unit 130 to the internal storage unit 140 through the DMA controller 160.

In an embodiment, the processing unit 110 may control each component in the encoding module 120. First, the processing unit 110 may set and check register values associated with the hardware accelerator controller 121, and then activate the encoding module 120 to encode the current frame. It is necessary for the processing unit 110 to request and register a corresponding DMA channel, check status of the DMA channel, and set registers associated with the DMA controller 160 to activate the DMA controller. After activating the encoding module 120 and the DMA controller 160 by the processing unit 110, the encoding module 120 may start to encode the current frame. It should be noted that, the encoding module 120 and the processing unit 110 is controlled by a frame level flow. Before finishing the encoding procedure of each current frame by the hardware accelerator, the processing unit 110 (i.e. software) may pre-execute an encoding program (e.g. program codes) for performing calculation of entropy encoding and bit rate control of the previous frame. The encoding program may detect whether the hardware encoding unit has completed the encoding procedure of the current frame. When the encoding module 120 has not finished the encoding procedure of the current frame yet, the processing unit 110 may execute other programs having higher priority and being ready for execution. Specifically, when the encoding module 120 has finished the encoding procedure of the current frame, the encoding module 120 may generate an interrupt signal. Accordingly, an interrupt service program executed by the processing unit 110 may send an event completion signal to the encoding program. Then, the encoding program may retake control of the processing unit 110 to encode the next frame.

In another embodiment, the processing unit 110 may further execute various programs to perform encoding post-processing, such as executing an entropy decoding program, a bit rate control program and a boundary extension program. The entropy encoding program may indicate that the processing unit 110 read encoding parameters and RLL codes from the external storage unit 130 to perform entropy encoding, and output a video bitstream of an image. The bit rate control program may indicate that the processing unit 110 may calculate quantization parameters of the next frame according to encoding results of the current frame, the total bit rate, and the frame rate. The boundary extension program may indicate that the processing unit 110 performs boundary extension to the reconstructed frame, which is used for calculation of motion estimation of the next frame, outputted by the hardware encoding unit.

In an embodiment, the internal storage unit 140 may comprise a residue macroblock buffer 141, a first-in-first-out (FIFO) buffer 142, a current macroblock buffer 143, a searching window buffer 144, and a de-blocking filter buffer 145. The residue macroblock buffer 141 is configured to store residue values of macroblocks for motion compensation. The FIFO buffer 142 is configured to store encoding parameters and RLL codes, wherein the encoding parameters are from the hardware accelerator controller 121, and the RLL codes are from the DCT and quantization accelerator 123. The current macroblock buffer 143 is configured to store the current macroblock. The searching window buffer 144 is configured to store macroblocks in the searching window for motion estimation. The de-blocking filter buffer 145 is configured to store reconstructed macroblocks after motion compensation and filtered macroblocks generated by the in-loop filtering acceleration circuit 124. In addition, the in-loop filtering acceleration circuit 124 reads reconstructed macroblocks, which are generated by the DCT and quantization accelerator 123, from the de-blocking filter buffer 145, and performs in-loop filtering to the reconstructed macroblocks to generate filtered macroblocks, and writes the filtered macroblocks into the de-blocking filter buffer 145.

The hardware accelerator controller 121 may set and manage each component in the encoding module 120. For example, when the motion estimation acceleration circuit 121 in the encoding module 120 has completed encoding of a macroblock, the motion estimation acceleration circuit 121 may send a first interrupt signal to the hardware accelerator controller 121. Meanwhile, the hardware accelerator controller 121 may set and activate subsequent corresponding accelerators and acceleration circuits. When hardware (e.g. the in-loop filtering acceleration circuit 124) in the encoding module 120 has completed encoding of a frame, the hardware accelerator controller 121 may send a second interrupt signal to the processing unit 110. Then, the processing unit 110 may write the encoding parameters to registers (not shown) inside the hardware accelerator controller 121 directly, so that the hardware accelerator controller 121 may set each hardware component in the encoding module 120.

B. Motion Estimation Method

B-1. Prediction of Searching the Start Point

The motion estimation acceleration circuit 122 in the invention may use a prediction-based 12-point line searching algorithm to complete motion estimation of integer pixels (i.e. details will be described later), and to perform motion estimation of half pixels. The motion estimation acceleration circuit 122 may search for eight points while performing motion estimation of half pixels, and the interpolation and motion estimation of half pixels can be executed in parallel. The motion estimation method for integer pixels provided in the invention may comprise the following four steps of: (1) predicting the start searching point; (2) 12-point line searching based on a 8×8 block; (3) motion searching of 16×16 macroblocks; and (4) determining the macroblock mode for motion estimation.

Figure 2:
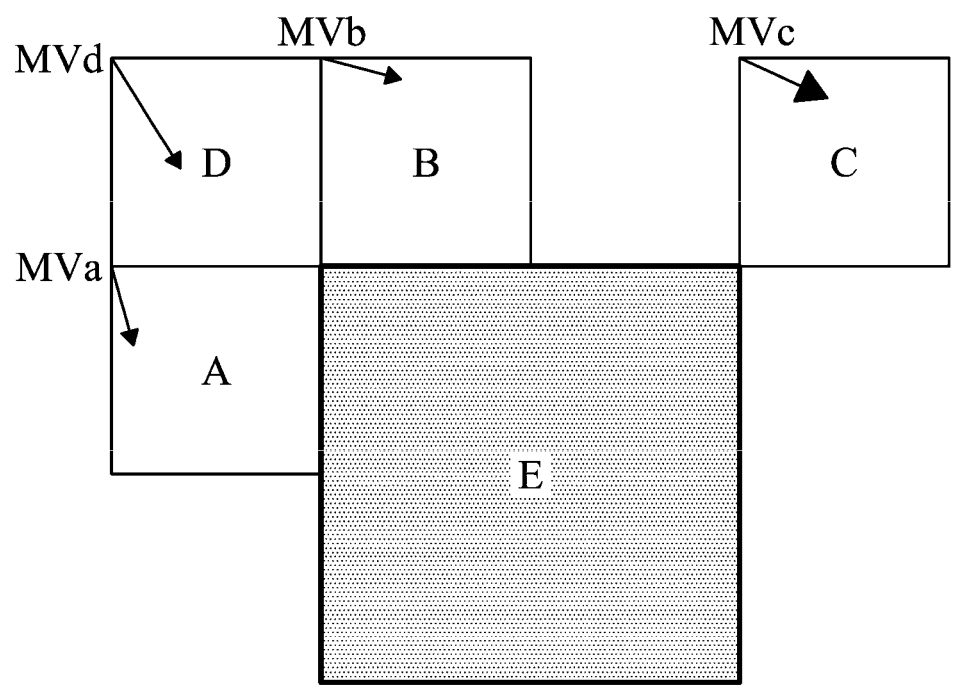
FIG. 2 is a diagram illustrating prediction of the start search point in the motion estimation method according to an embodiment of the invention.
Figure 19A:
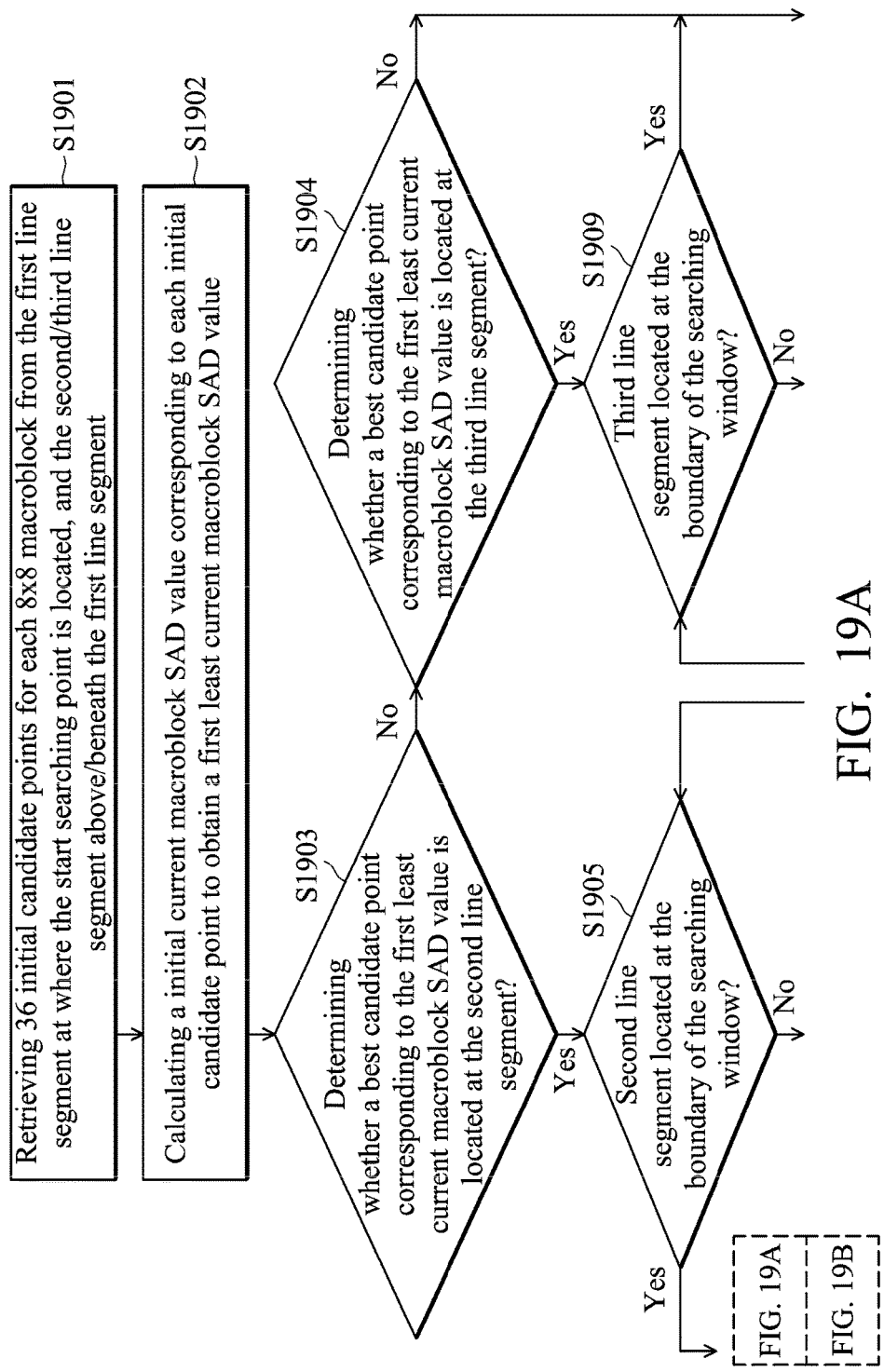
FIGS. 19A and 19B are portions of a flow chart illustrating the motion estimation method according to an embodiment of the invention.
Figure 19B:
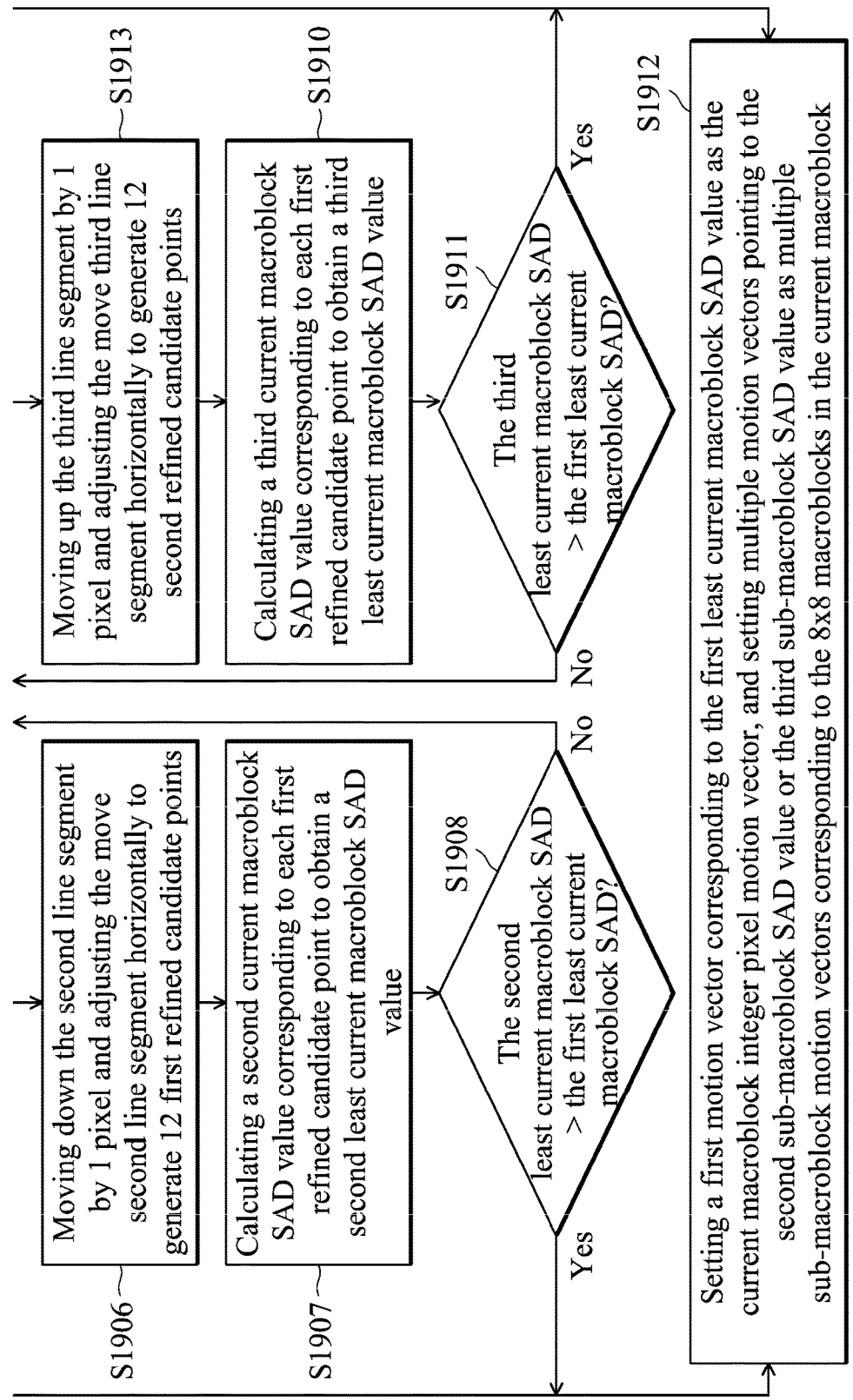

FIG. 2 is a diagram illustrating prediction of the start search point in the motion estimation method according to an embodiment of the invention. FIGS. 19A and 19B are portions of a flow chart illustrating the motion estimation method according to an embodiment of the invention. Referring to FIGS. 2, 19A and 19B, the motion estimation acceleration circuit 122 may confirm the start searching point for every macroblock before performing motion estimation. The motion estimation acceleration circuit 122 may predict the start searching point by using motion vectors of neighboring macroblocks. As illustrated in FIG. 2, motion vectors MVa, MVb, MVc and MVd of a left neighboring macroblock A, a upper neighboring macroblock B, a upper-right neighboring macroblock C and a upper-left neighboring macroblock D of the current macroblock E are referenced to predict the start searching point. First, the four pixels pointed by the motion vectors MVa, MVb, MVc, and MVd of the four neighboring macroblocks of the current macroblock E are checked, and the sum of absolute difference (SAD) corresponding to each of the four points is calculated. The point with the least SAD value is regarded as the start searching point for motion estimation. It should be noted that some neighboring macroblocks may not exist if the current macroblock is located at the boundary of the image. Meanwhile, a zero-valued motion vector may be used to substitute the motion vectors of the non-existing neighboring macroblocks, and the predicted reference point is set to zero-point.

B-2. 12-Point Line Segment Searching of Integer Pixels

Figure 3:
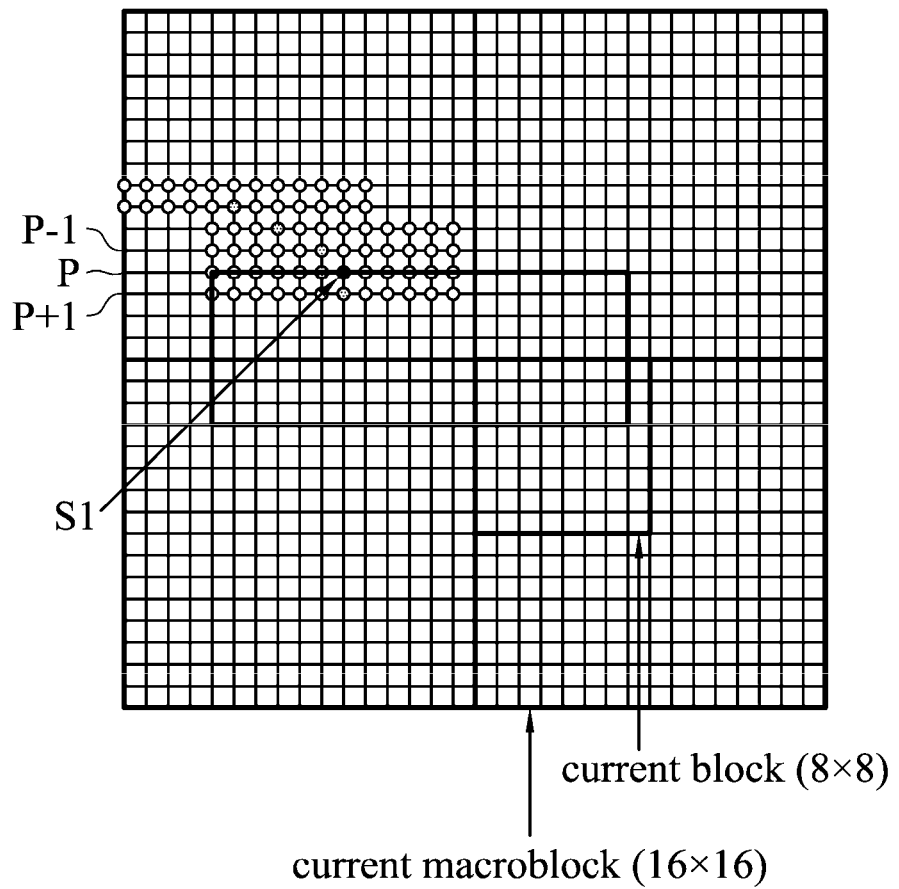
FIG. 3 is a diagram illustrating the motion estimation method according to an embodiment of the invention.

FIG. 3 is a diagram illustrating the motion estimation method according to an embodiment of the invention. The motion estimation method used in the motion estimation acceleration circuit 122 is based on searching the 12-point line segments of integer pixels. FIGS. 19A and 19B shows a flow chart illustrating the motion estimation method according to an embodiment of the invention.

Four steps are described in the motion estimation method. Step 1: as illustrated in FIG. 3, the current macroblock is divided into four 8×8 blocks. For each 8×8 block, the motion estimation acceleration circuit 122 may search for three 12-point line segments p−1, p and p+1 taking the pixel-word at which the start point S1 is located as center, and thus there are 36 candidate pixels, such as the white points illustrated in FIG. 3. Then, a $SAD_{16 \times 16}$ value of a candidate point can be obtained by summarizing four $SAD_{8 \times 8}$ values corresponding to the same candidate point (i.e. 36 $SAD_{16 \times 16}$ values in total). If the reference point corresponding to the least $SAD_{16 \times 16}$ value (e.g. the best reference point, such as the gray point illustrated in FIG. 3) is located on the line segment p+1, step 2 is performed. If the best reference point is located on the line segment p−1, step 3 is performed. Otherwise, step 4 is performed.

Step 2: the motion estimation acceleration circuit 122 sets the value p=p+1, and searches for 12 candidate points on the line segment p. Furthermore, the locations of 12 candidate points on the line segment p+1 should be adjusted horizontally according to the location of the best reference point on the line segment p, and thus it can be ensured that the pixel word of the middle four points and the pixel word of the best reference point on the line segment p are located in the same row. Then, the 12 candidate points on the line segment p are searched, and the $SAD_{16\times16}$ value of each candidate point can be obtained by summarizing four $SAD_{8\times8}$ values corresponding to the same candidate point. If the reference point corresponding to the least $SAD_{16\times16}$ value (i.e. the best reference point) is located on the line segment p, step 4 is performed. Otherwise, step 2 is performed repeatedly until the reference point corresponding to the least $SAD_{16\times16}$ value is located on the line segment p or the boundary of a 48×48 searching window is reached.

Step 3: the motion estimation acceleration circuit 122 sets the value p=p−1, and searches for the 12 candidate points on the line segment p. Furthermore, the locations of 12 candidate points on the line segment p+1 should be adjusted horizontally according to the location of the best reference point on the line segment p, and thus it can be ensured that the pixel word of the middle four points and the pixel word of the best reference point on the line segment p are located in the same row. Then, the 12 candidate points on the line segment p are searched, and the $SAD_{16\times16}$ value of each candidate point can be obtained by summarizing four $SAD_{8\times8}$ values corresponding to the same candidate point. If the reference point corresponding to the least $SAD_{16\times16}$ value (i.e. the best reference point) is located on the line segment p, step 4 is performed. Otherwise, step 3 is performed repeatedly until the reference point corresponding to the least $SAD_{16\times16}$ value is located on the line segment p or the boundary of a 48×48 searching window is reached.

Step 4: the motion estimation acceleration circuit 122 may set the motion vector $MV_{16\times16}$ of the 16×16 macroblock to the motion vector corresponding to the least $SAD_{16\times16}$ value, and set the motion vectors $MV_{8\times8}$ of the four 8×8 blocks to the motion vector corresponding to the least $SAD_{8\times8}$ value.

Referring to FIGS. 19A and 19B, details of the aforementioned steps 1~4 can be described with the steps illustrated in FIGS. 19A and 19B:

(a) In step S1901, the current macroblock is divided into at least one 8×8 block. For each 8×8 block, taking a pixel word comprising four pixels at where the start searching point is located as center, 36 initial candidate points can be retrieved from a first line segment, a second line segment and a third line segment (i.e. the first/second/third line segments are aligned, as shown in FIG. 3), wherein the first line segment comprises the pixel word and four neighboring pixels at the right and left sides of the pixel word, and the second line segment is on the first line segment, and the third line segment is beneath the first line segment;

(b) In step S1902, a first SAD value of each initial candidate point relative to each 8×8 block is calculated, thereby obtaining an initial current macroblock SAD value corresponding to each initial candidate point. Thus, a first least current macroblock SAD value can be obtained according to the initial current macroblock SAD values;

(c) In step S1903, it is determined whether a best reference point corresponding to the first least current macroblock SAD value is located on the second line segment or not. If so, step (d) (i.e. step S1905) is performed. If not, it is further determined whether the reference point corresponding to the first least current macroblock SAD value is located on the third line segment (step S1904). If so, step (g) (i.e. step S1909) is performed. Otherwise, step (j) (i.e. step S1912) is performed;

(d) In step S1905, it is determined whether the second line segment is located on a boundary of a searching window corresponding to the current macroblock or not. If so, step (j) (i.e. step S1912) is performed. If not, the second line segment is moved down by a pixel, and the moved second line segment is adjusted horizontally to generate 12 first refined candidate points according to a pixel word where the best reference point is located (step S1906), and step (e) is performed;

(e) In step S1907, a second sub-macroblock SAD value of each first refined candidate point relative to each 8×8 block is calculated, thereby obtaining a second current macroblock SAD value corresponding to each first refined candidate point. Then, a second least current macroblock SAD value can be obtained according to the second current macroblock SAD value corresponding to each first refined candidate point;

(f) In step 1908, it is determined whether the second least current macroblock SAD value is larger than the first least current macroblock SAD value. If so, step (j) (i.e. step S1912) is performed. If not, the second least current macroblock SAD value is set to the first least current macroblock SAD value, and step (d) (i.e. step S1905) is performed.

(g) In step S1909, it is determined whether the third line segment is located on a boundary of the searching window corresponding to the current macroblock. If so, step (j) (i.e. step S1912) is performed. If not, the third line segment is moved up by one pixel, and the moved third line segment is adjusted horizontally to generate 12 second refined candidate points according to a pixel word where the best reference point is located (step S1913), and step (h) (i.e. step 1910) is performed;

(h) In step S1910, a third sub-macroblock SAD value of each second refined candidate point relative to each 8×8 block is calculated, thereby obtaining a third current macroblock SAD value corresponding to each second refined candidate point. Then, a third least current macroblock SAD value can be obtained according to the third current macroblock SAD value corresponding to each second refined candidate point;

(i) In step S1911, it is determined whether the third least current macroblock SAD value is larger than the first least current macroblock SAD value. If so, step (j) (i.e. step S1912) is performed. If not, the third least current macroblock SAD value is set to the first least current macroblock SAD value, and step (g) (i.e. step S1909) is performed;

(j) In step S1912, the current macroblock integer pixel motion vector is set to a first motion vector corresponding to the first least current macroblock SAD value, and multiple sub-macroblock motion vectors corresponding to the 8×8 blocks in the current macroblock are set to multiple motion vectors pointing to the second sub-macroblock SAD values or the third sub-macroblock SAD values.

B-3. 8-Point Searching Based on Half Pixels

The motion estimation acceleration circuit 122 may take the reference point corresponding to the least $SAD_{16\times16}$ value as center, and searches for eight half pixels around the center. If the $SAD_{8\times8}$ or $SAD_{16\times16}$ value corresponding to the half pixels is smaller than the SAD value of integer pixels, the motion estimation acceleration circuit 122 may update the motion vectors corresponding to the 8×8 blocks or the 16×16 macroblock.

B-4. Decision of Macroblock Mode for Motion Estimation

For the MPEG4 standard, the motion estimation acceleration circuit 122 may determine whether an INTER mode (i.e. for 16×16 macroblocks) or an INTER4V mode (i.e. for 8×8 blocks) is used for encoding the current macroblock according to a rate distortion optimization (RDO) value. The mode with a smaller RDO value may have a higher priority, and the motion estimation acceleration circuit 122 may select the mode with a smaller RDO value as the encoding mode for the current macroblock.

C. Storage Format of Current Macroblock Buffer and Searching Window Buffer

In an embodiment, the current frame and the reference frame for motion estimation are stored in the external storage unit 130, and the current macroblock and the searching window are stored in the internal storage unit 140. When starting the encoding process, the hardware accelerator controller 121 may read the current macroblock and the searching window from the external storage unit 130, and write the current macroblock and the searching window to the internal storage unit 140. The current macroblock is stored in the current macroblock buffer 143, and the pixels of the searching window are stored in the searching window buffer 144. For the current macroblock and the searching window, each pixel may have an 8-bit accuracy, and neighboring pixels in the horizontal direction are placed into the same pixel word.

Figure 4:
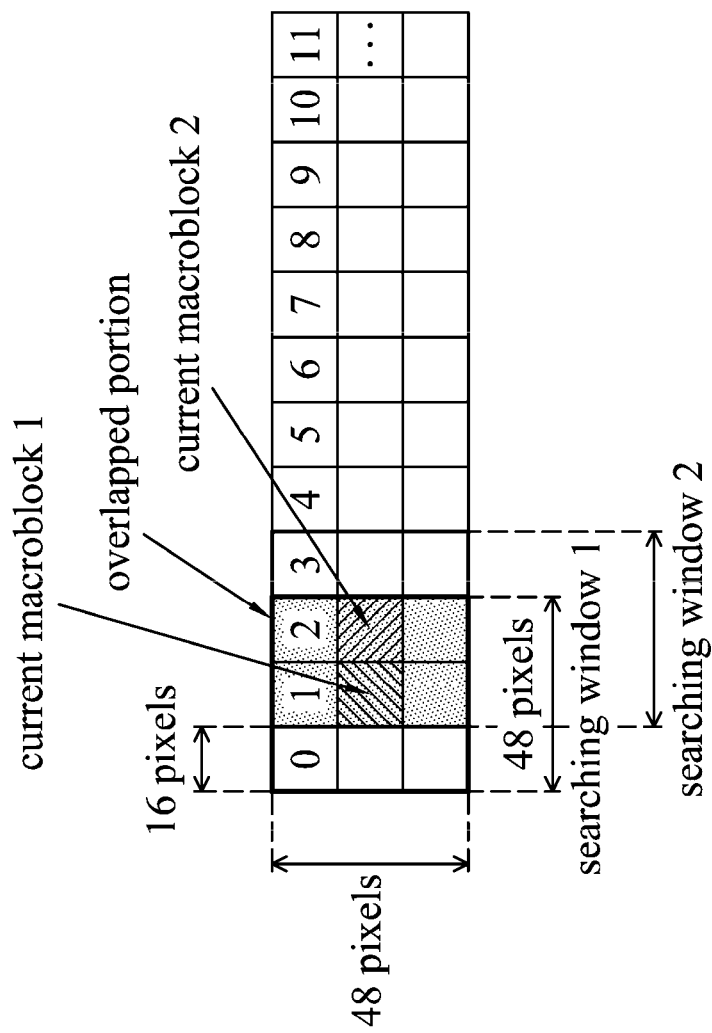
FIG. 4 is a diagram illustrating overlapped searching windows of horizontally neighboring macroblocks according to an embodiment of the invention.
Figure 5:
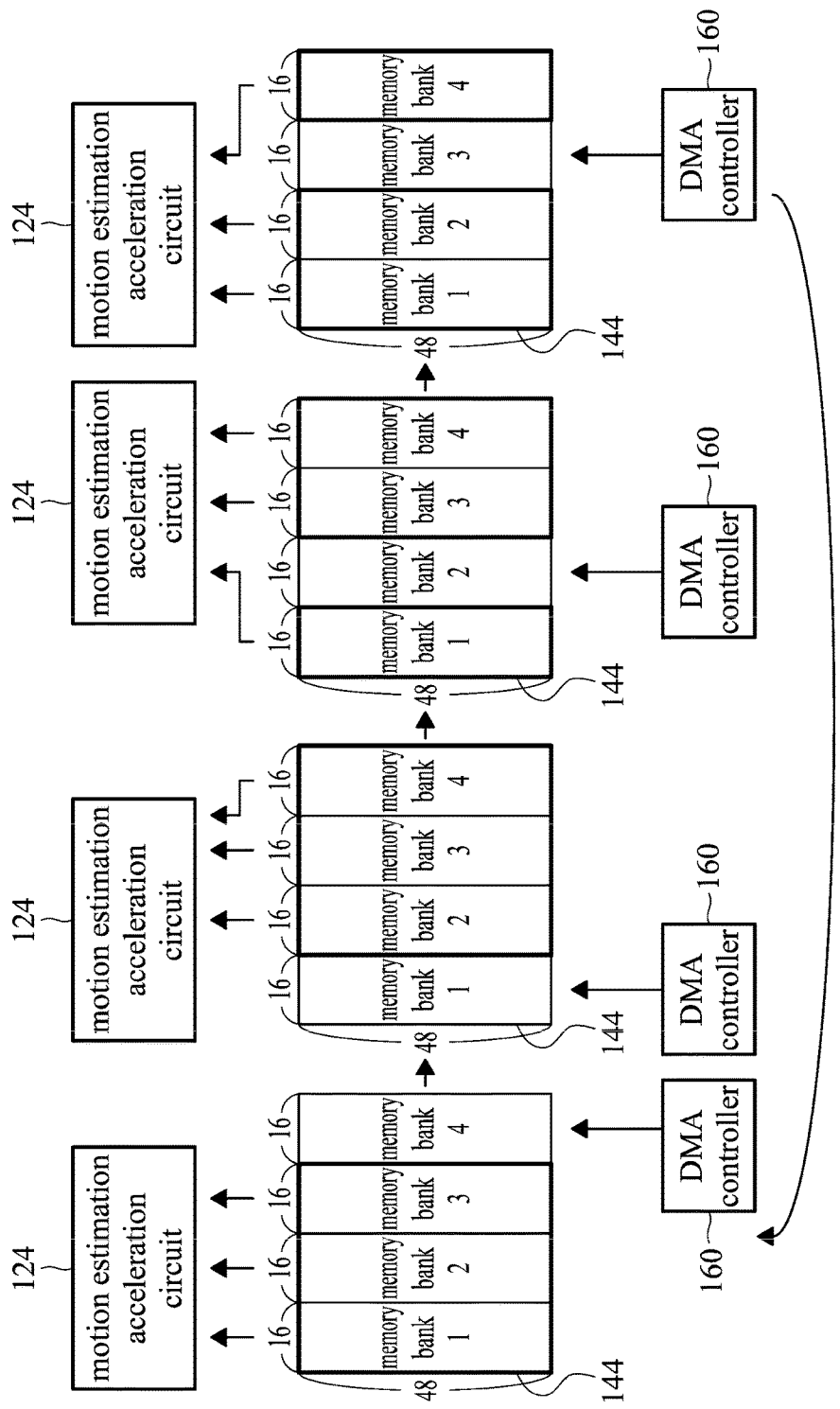
FIGS. 5A~5D are diagrams illustrating the architecture of the searching window buffer according to an embodiment of the invention.

FIG. 4 is a diagram illustrating overlapped searching windows of horizontally neighboring macroblocks according to an embodiment of the invention. In an embodiment, a search range for motion estimation used in the motion estimation acceleration circuit 122 is (−16, 15.5), and the size of the corresponding searching window may be 48×48 pixels. As illustrated in FIG. 4, the overlapped portion between the searching windows of the two horizontally neighboring macroblocks is 32×48 pixels.

In order to reduce the memory bandwidth for accessing the external storage unit 130 by using the overlapped portion effectively, the searching window buffer 144 in the invention is implemented in the architecture of four memory banks. Each memory bank may store a region of 16×48 pixels. The motion estimation acceleration circuit 122 may access a 48×48 searching window comprising three memory banks, whereas the remaining memory bank is accessed by the DMA controller 160. That is, the DMA controller 160 may read the region of 16×48 pixels for motion estimation of the next macroblock from the external storage unit 130 to the searching window buffer 144. Since there are four memory banks in the searching window buffer 144, it can be ensured that the calculation of motion estimation and accessing of the searching window of the next macroblock can be performed in parallel.

FIGS. 5A~5D are diagrams illustrating the architecture of the searching window buffer according to an embodiment of the invention. Given that four neighboring macroblocks are MB1, MB2, MB3 and MB4, when the motion estimation acceleration circuit 122 performs motion estimation of the current macroblock by using the respective macroblocks MB1, MB2, MB3, and MB4, the searching window comprises three different memory banks in the searching window buffer 144 alternately. Meanwhile, the DMA controller 160 may write the region of 16×48 pixels for motion estimation of the next macroblock into the memory bank 4, memory bank 1, memory bank 2 and memory bank 3 sequentially, as illustrated in FIGS. 5A~5D. Accordingly, the motion estimation acceleration circuit 122 may read the 48×48 searching window from the external storage unit 130 when starting calculation for motion estimation of the first macroblock in each row. For calculation of motion estimation of the remaining macroblocks in each row, the motion estimation acceleration circuit 122 may only have to read a region of 16×48 pixels from the external storage unit 130. Therefore, the invention may reduce the memory bandwidth for accessing the external storage unit 130 effectively.

D. Architecture of Motion Estimation Acceleration Circuit

Figure 6:
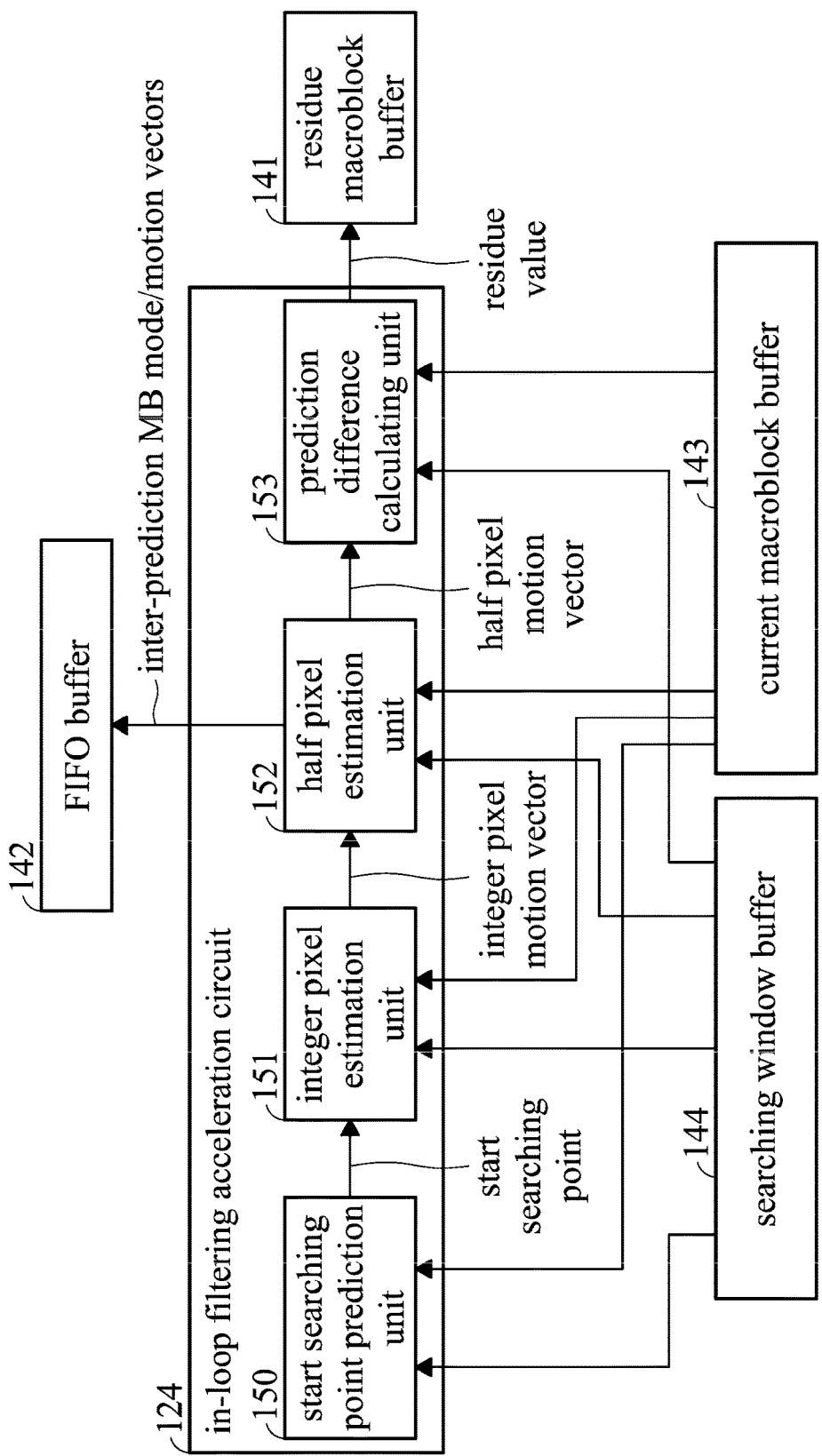
FIG. 6 is a schematic diagram of the motion estimation acceleration circuit 122 according to an embodiment of the invention.

FIG. 6 is a schematic diagram of the motion estimation acceleration circuit 122 according to an embodiment of the invention. The motion estimation acceleration circuit 122 may comprise a start searching point prediction unit 150, an integer pixel estimation unit 151, a half pixel estimation unit 152, and a prediction difference calculating unit 153. Each component in the motion estimation acceleration circuit 122 may execute a calculating procedure associated with its name, respectively. For example, the start searching point prediction unit 150 may search for and predict the start point for motion estimation, as described in section B-1 and illustrated in FIG. 2. After the motion estimation acceleration circuit 122 is activated, the start searching point prediction unit 150 may read pixels of the searching window and the current macroblock from the searching window buffer 144 and the current macroblock buffer 143, respectively, according to motion vectors of the neighboring macroblocks of the current macroblock. Then, the start searching point prediction unit 150 may further calculate SAD values of the candidate points, and select a start searching point prediction value by comparing all the SAD values. Further, the start searching point prediction unit 150 may transmit the start searching point prediction value to the integer pixel estimation unit 151, so that the integer pixel estimation unit 151 may perform a 12-point line segment searching process for motion estimation.

The integer pixel estimation unit 151 may read pixels of the searching window and the current macroblock from the searching window buffer 144 and the current macroblock buffer 143, respectively. Then, the integer pixel estimation unit 151 may calculate SAD values of all candidate points, and determine motion vectors of integer pixels by comparing all the SAD values. The integer pixel estimation unit 151 may transmit the motion vectors of integer pixels to the half pixel estimation unit 152.

The half pixel estimation unit 152 may perform calculation of interpolation and motion estimation of half pixels. The half pixel estimation unit 152 may read pixels of the searching window and the current macroblock from the searching window buffer 144 and the current macroblock buffer 143, respectively, and generate reference macroblocks by interpolation. The half pixel estimation unit 152 may further calculate SAD values of all candidate points, and determine motion vectors for half pixels by comparing all the SAD values.

The prediction difference calculating unit 153 may read pixels of the best reference macroblock from the searching window 144 according to the motion vectors for half pixels generated by the half pixel estimation unit 152. The prediction difference calculating unit 153 may further obtain residue values by subtracting pixels of the best reference macroblock by pixels of the current macroblock, and write the residue values into the residue macroblock buffer 141.

E. Hardware Architecture for Searching Integer Pixels

Figure 7:
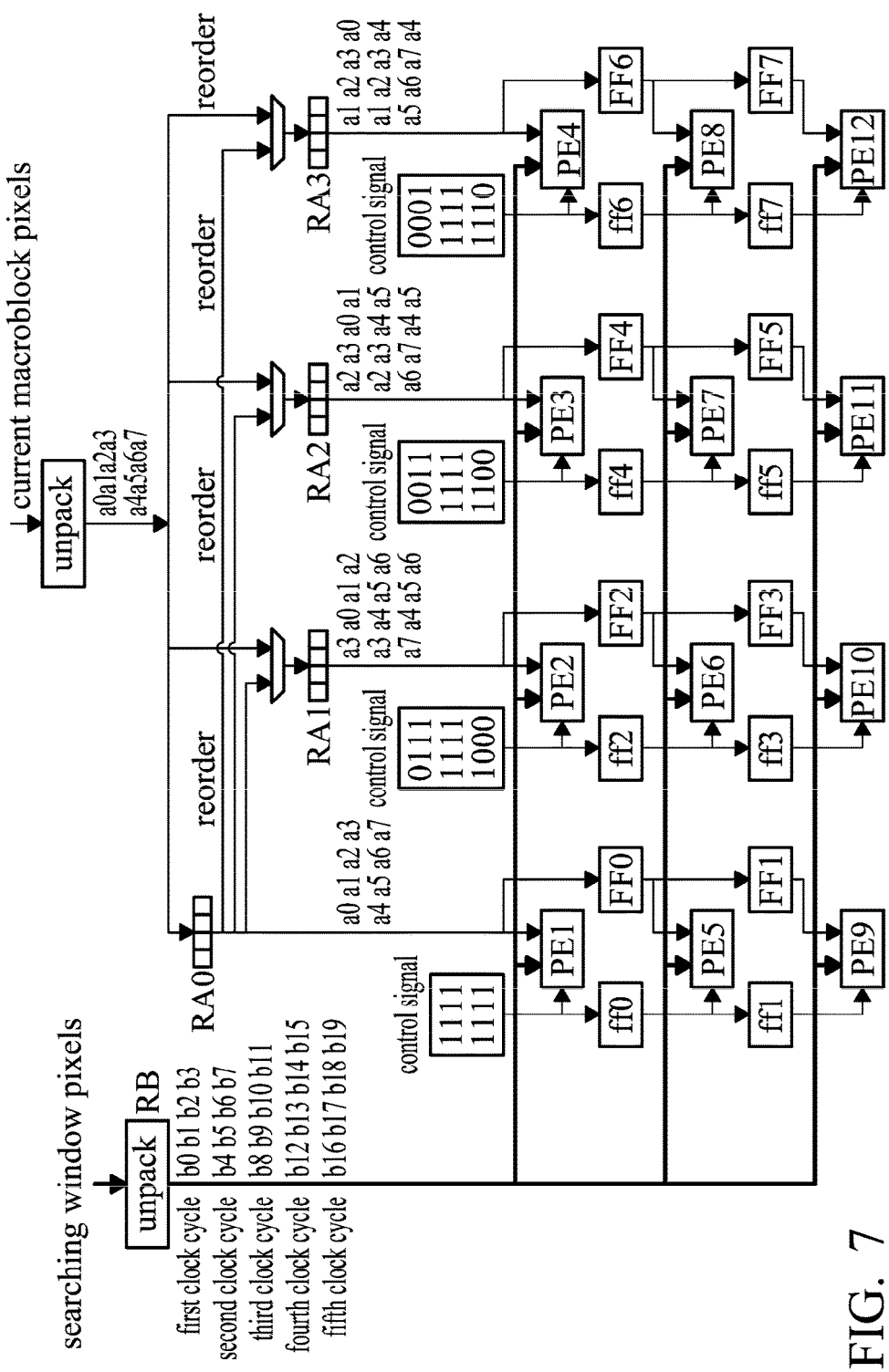
FIG. 7 is a block diagram illustrating the hardware architecture of the integer pixel estimation unit 151 according to an embodiment of the invention.

FIG. 7 is a block diagram illustrating the hardware architecture of the integer pixel estimation unit 151 according to an embodiment of the invention. In an embodiment, the integer pixel estimation unit 151 may implement the aforementioned 12-point line segment searching algorithm by using a systolic array comprising 12 parallel processing elements (PE). As illustrated in FIG. 7, the 12 processing elements of the integer pixel estimation unit 151 may be divided into four sub-arrays, wherein the first sub-array comprises processing elements PE1, PE5 and PE9; the second sub-array comprises processing elements PE2, PE6 and PE10; the third sub-array comprises processing elements PE3, PE7 and PE11; and the fourth sub-array comprises processing elements PE4, PE8 and PE12. Each processing element may have two input terminals, and pixels in the searching window buffer 144 can be broadcasted to all 12 processing elements. Pixels of the current macroblocks may be reordered into four sets of input data, and the four sets of input data are transmitted to the four sub-arrays, respectively. In addition, the transmission path of the input data is sequential in each sub-array (e.g. PE1→PE5→PE9). Also, eight 32-bit flip-flops are used as delaying units in four transmission paths of pixels of the current macroblock.

Since the current macroblock and the searching window are respectively stored in the current macroblock buffer 143 and the searching window buffer 144, the integer pixel estimation 151 may access these two buffers simultaneously via two different physical channels (e.g. memory channels). In addition, pixels are stored in the format of pixel words in the current macroblock buffer 143 and the searching window buffer 144, and thus a pixel word of the current macroblock and a pixel word of the searching window can be read simultaneously from the current macroblock buffer 143 and the searching window buffer 144 every clock cycle, wherein each pixel word is divided into four pixels to be written into the register arrays (e.g. RA0, RA1, RA2, and RA3).

In the first clock cycle, the integer pixel estimation unit 151 writes pixels b0~b3 of the searching window into the register array RB, and writes pixels a0~a3 of the current macroblocks into the register array RA. In addition, pixels a0~a3 are arranged into different orders and written into the register arrays RA1, RA2 and RA3, as illustrated in FIG. 7.

In the second clock cycle, the integer pixel estimation unit 151 may broadcast the pixels b0~b3 of the searching window stored in the register array RB to all the 12 processing elements, and transmit pixels of the current macroblock stored in the register arrays RA0~RA3 to the four sub-arrays through four transmission paths. In the second clock cycle, the processing elements PE1~PE4 have received pixels of the current macroblock and the searching window for calculation, the processing elements PE5~PE12 are idling since they have not received the pixels of the current macroblock yet. Meanwhile, the integer pixel estimation unit 151 may keep on reading the current macroblock buffer 143 and the searching window buffer 144, store pixels b4~b7 of the searching window to the register array RB, and store pixels a4~a7 of the current macroblock to the register array RA0. The integer pixel estimation unit 151 may further reorder the pixels a4~a7 of the current macroblock and substitute some pixels in the register arrays RA1~RA3 with the reordered pixels a4~a7, as illustrated in FIG. 7.

In the third clock cycle, the integer pixel estimation 151 may broadcast the pixels b4~b7 of the searching window to all the 12 processing elements. Pixels of the current macroblock stored in the register arrays RA0~RA3 are transmitted to the four sub-arrays via four different transmission paths, so that the pixels can be transmitted sequentially in the processing elements in each sub-array. In the third clock cycle, the processing elements PE1~PE8 have received pixels of the current macroblock and the searching window for calculation, but the processing elements PE9~PE12 are idling since they have not received the pixels of the current macroblock yet. Meanwhile, the integer pixel estimation unit 151 may keep on reading the searching window buffer 144, and store the pixels b8~b11 of the searching window into the register array RB. The integer pixel estimation unit 151 may further reorder pixels a4~a7 of the current macroblock stored in the register array RA0, and substitute some pixels in the register arrays RA1~RA3 with the reordered pixels, as illustrated in FIG. 7.

In the fourth clock cycle, the integer pixel estimation unit 151 may broadcast the pixels b8~b11 of the searching window to all the 12 processing elements. Pixels of the current macroblock stored in the register arrays RA0~RA3 are transmitted to the four sub-arrays via four different transmission paths, so that the pixels can be transmitted sequentially in the processing elements in each sub-array. Meanwhile, the integer pixel estimation unit 151 may keep reading the searching window buffer 144, and store the pixels b12~b15 of the searching window into the register array RB. Therefore, all processing elements on the four transmission paths have received pixel data for calculation in the fourth clock cycle.

In the fifth clock cycle, the integer pixel estimation unit 151 may broadcast the pixels b12~b15 of the searching window to all the 12 processing elements. Also, the processing elements PE1~PE4 are idling since they do not receive any new pixels of the current macroblock, and the processing elements PE5~PE12 have received pixels of the searching window and pixels of the current macroblock from the delaying units FF0~FF7 for calculation. Meanwhile, the integer pixel estimation unit 151 may keep reading the searching window buffer 144, and store the pixels b16~b19 of the searching window into the register array RB.

In the sixth clock cycle, the integer pixel estimation unit 151 has completed calculation of difference values of a pixel row (e.g. 12 integer pixels). Further, each processing element may comprise an accumulator, and the integer pixel estimation unit 151 may accumulate and store the difference values corresponding to the 12 candidate points, and calculation of a $SAD_{8\times8}$ value of the 12 candidate points can be completed by repeating the aforementioned steps 8 times. Then, the least $SAD_{8\times8}$ value can be obtained by using the comparators, and thus a corresponding motion vector $MV_{8\times8}$ can be obtained. The integer pixel estimation unit 151 may keep calculating the $SAD_{8\times8}$ value of the 12 candidate points in the other three 8×8 blocks, thereby obtaining twelve $SAD_{16\times16}$ values. The integer pixel estimation unit 151 may further obtain the least $SAD_{16\times16}$ value by using the comparators, thereby obtaining the corresponding motion vector $MV_{16\times16}$.

Figure 8:
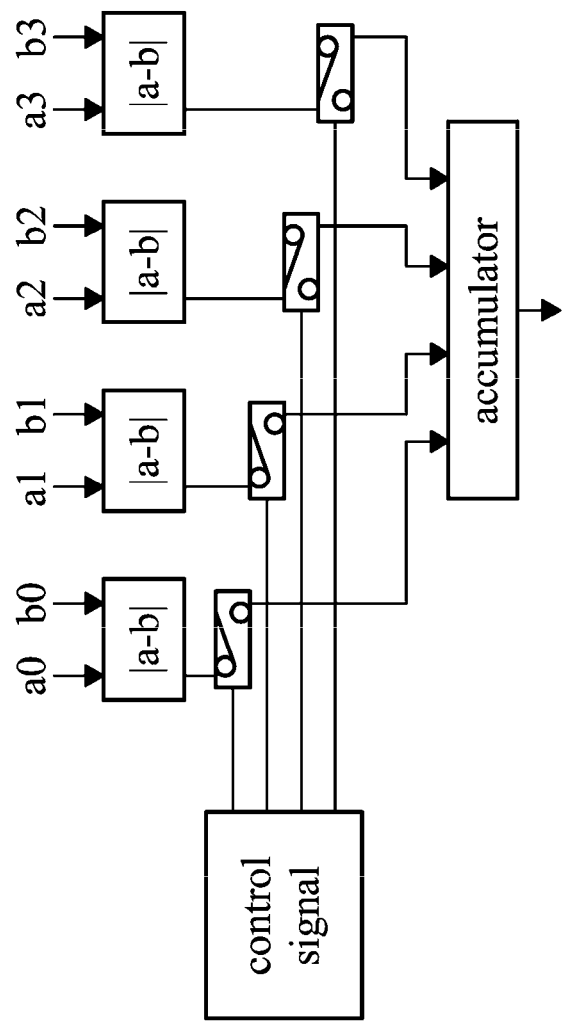
FIG. 8 is a structure diagram illustrating a processing element in the integer pixel estimation unit 151 according to an embodiment of the invention.

FIG. 8 is a structure diagram illustrating a processing element in the integer pixel estimation unit 151 according to an embodiment of the invention. As illustrated in FIG. 8, the processing element may comprise four SAD calculating units and an accumulator. In every clock cycle, the processing element may receive four pixels of the current macroblock and four pixels of the searching window, and calculate absolute difference values of the four pixel pairs. The processing element may selectively accumulate the four absolute difference values. For each processing element, the corresponding control signal is a fixed 4-bit value in clock cycles for performing calculation of motion estimation.

Control signals between neighboring processing elements in the same set may have a one-clock-cycle delay. Accordingly, eight 4-bit flip-flops are used as delaying units in the integer pixel estimation unit 151 to distribute the control signal of each processing element.

F. Hardware Architecture for Half-Pixel Interpolation and Searching

In the MPEG4 and H.263 video codec standards, a motion vector point of an integer pixel is often taken as a center, and eight candidate half pixels around the center are searched while performing searching of half pixels. The reference macroblock corresponding to the eight half pixels is generated after linear interpolation of integer pixels. There are three modes for interpolation of half pixels, such as horizontal interpolation, vertical interpolation, and diagonal interpolation. Given that h, v, d denote the half pixels in the horizontal direction, vertical direction and diagonal direction, respectively; A1 and A2 denote the integer pixels horizontally neighboring to the half pixel h; A1 and A3 denote the integer pixels vertically neighboring to the half pixel v; and A1~A4 denote the integer pixels neighboring to the half pixel d, the interpolation for half pixels in different directions can be expressed as the following equations:

$$h=(A1+A2+1)>>1;$$

$$v=(A1+A3+1)>>1;$$

$$d=(A1+A2+A3+A4+2)>>2;$$

Figure 9A:
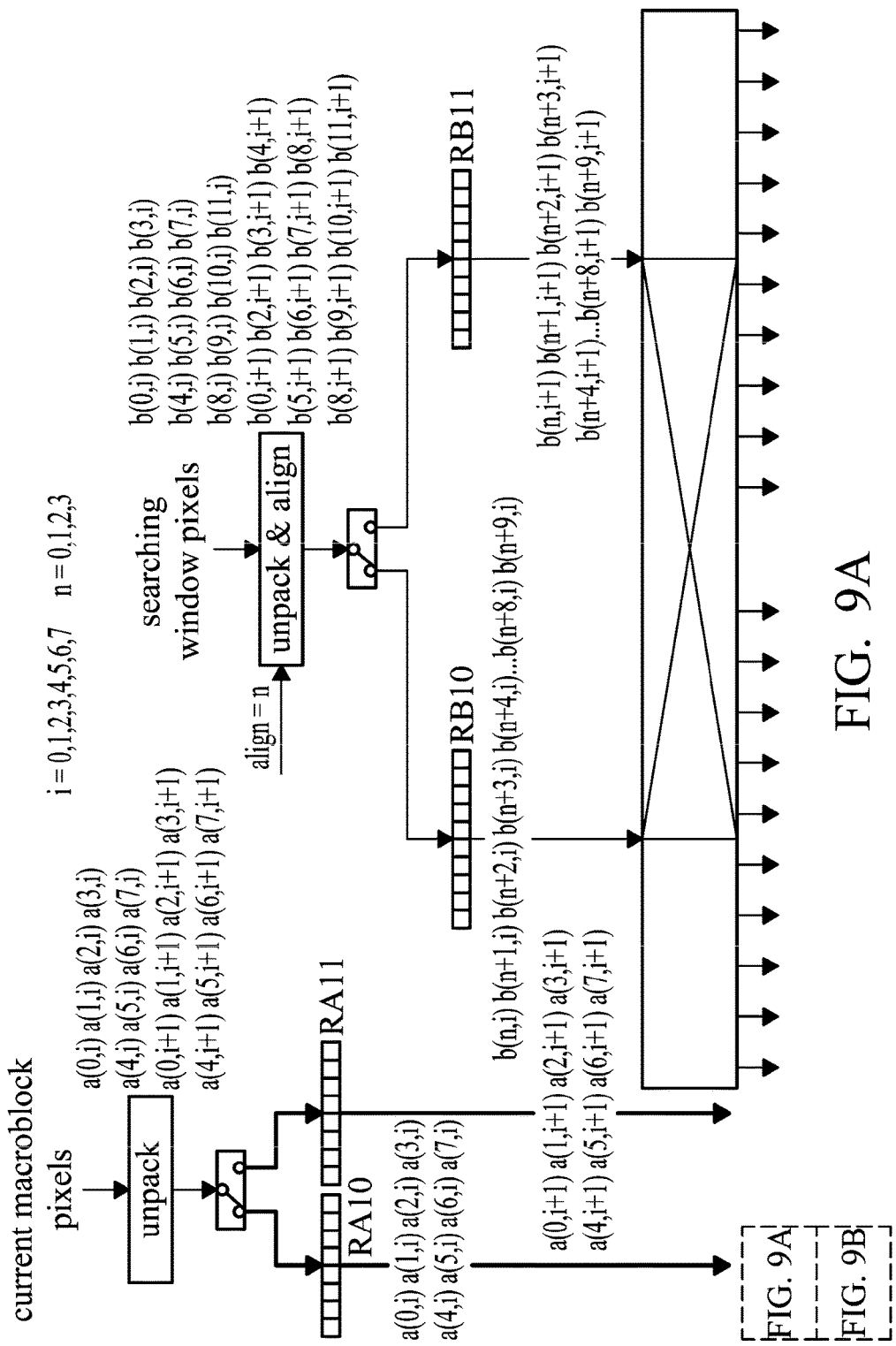
FIGS. 9A and 9B are portions of a diagram illustrating the hardware architecture of the half pixel estimation unit 152 according to an embodiment of the invention.
Figure 9B:
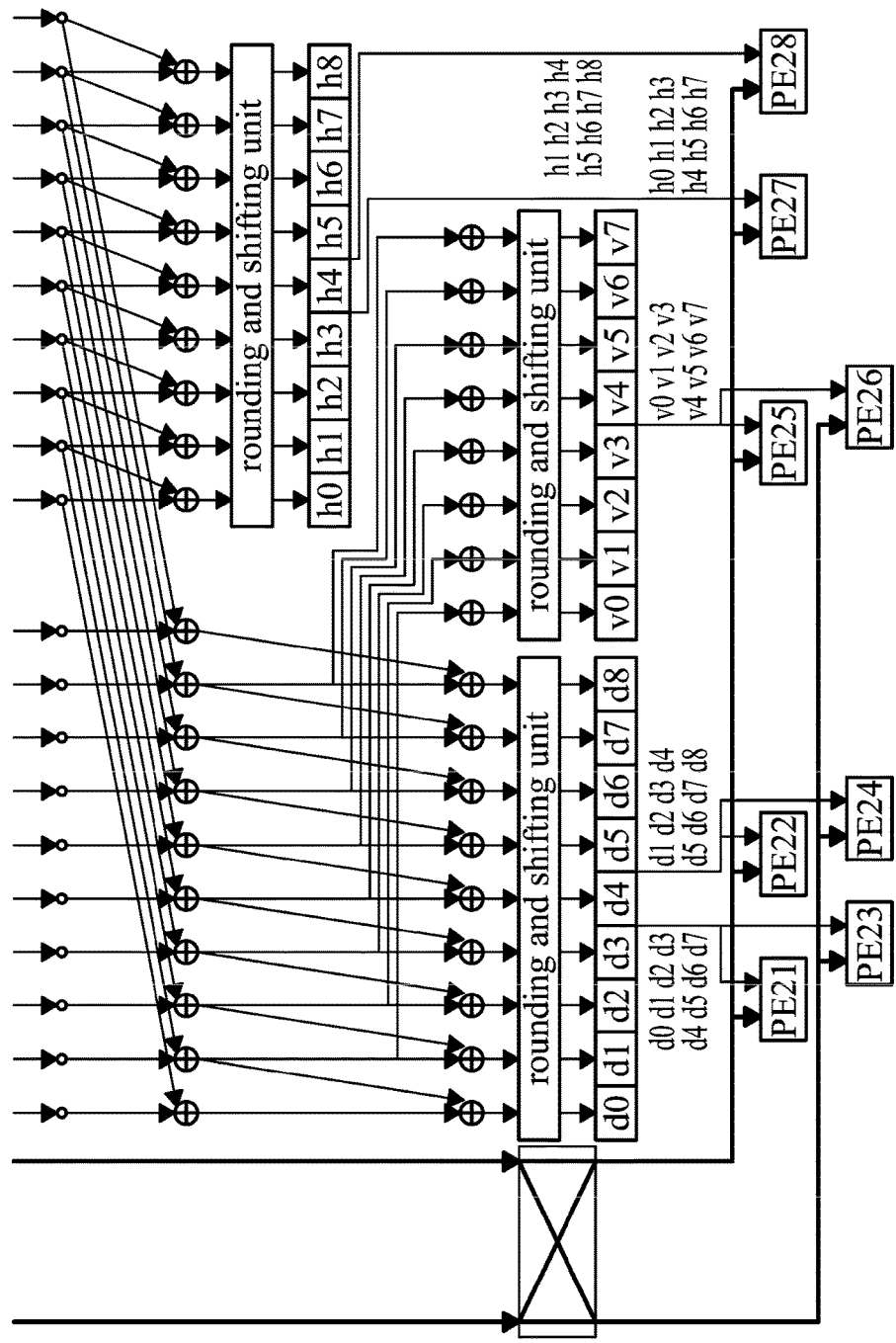

FIGS. 9A and 9B are portions of a diagram illustrating the hardware architecture of the half pixel estimation unit 152 according to an embodiment of the invention. The half pixel estimation unit 152 may comprise 4 sets of 10-bit adders and 3 sets of rounding and shifting units to implement interpolation of half pixels. The half pixel estimation unit 152 may further comprise eight parallel processing elements to implement searching of half pixels, as illustrated in FIGS. 9A and 9B. As described in aforementioned embodiments, pixels are stored in the format of pixel words in the current macroblock buffer 143 and the searching window 144. The half pixel estimation unit 152 may read a pixel word of the current macroblock from the current macroblock buffer 143 and a pixel word of the searching window from the searching window buffer 144 simultaneously. Each pixel word is unpacked into four pixels, and the unpacked four pixels are written into the register arrays (e.g. RA10 and RA11). In an embodiment, the current macroblock register comprises two ping-pong register arrays RA10 and RA11, and each of the register arrays RA10 and RA11 may comprise eight 8-bit registers. The searching window register is comprised of two ping-pong register arrays RB10 and RB11, and each of the register arrays RB10 and RB11 may comprise ten 8-bit registers.

When the half pixel estimation unit 152 starts to perform interpolation of half pixels, the half pixel estimation unit 152 may read eight pixels in the first row of the current macroblock from the current macroblock buffer 143, and write the eight pixels in the first row into the register array RA10. Similarly, the half pixel estimation unit 152 may read eight pixels in the second row of the current macroblock from the current macroblock buffer 143, and write the eight pixels in the second row into the register array RA11. The half pixel estimation unit 152 may read 10 pixels in the first row of the searching window from the searching window buffer 144, and write the 10 pixels in the first row to the register array RB10. Similarly, the half pixel estimation unit 152 may read 10 pixels in the second row of the searching window from the searching window buffer 144, and write the 10 pixels in the second row to the register array RB11. When the half pixel estimation unit 152 has completed calculation of interpolation and searching of half pixels in a row, the half pixel estimation unit 152 may further read pixels in a subsequent new row of the current macroblock from the current macroblock buffer 143, thereby substituting a prior row stored in the register array RA10 or RA11 with the new row. The half pixel estimation unit 152 may further read pixels in a subsequent new row of the searching window from the searching window buffer 144, thereby substituting a prior row stored in the register array RB10 or RB11 with the new row. While calculating interpolation of half pixels, the half pixel estimation unit 152 may simultaneously generate 9 half pixels in a row in the horizontal direction, 8 half pixels in a column in the vertical direction, and 9 half pixels in a row in the diagonal direction, so that the criterion to search for eight candidate half pixels simultaneously can be satisfied. Further, two lines, which each comprises 10 integer pixels, are required when the half pixel estimation unit 152 generates the aforementioned half pixels in different directions. In addition, the half pixel estimation unit 152 may read the two lines from the searching window buffer 144, and write the two lines into the register arrays RB10 and RB11, respectively. Since pixels are stored in the format of pixel words (i.e. each comprises four integer pixels) in the searching window buffer 144, the half pixel estimation unit 152 has to read three pixel words continuously from the searching window buffer 144 while reading 10 integer pixels in a line. The half pixel estimation unit 152 may further unpack the three pixel words into 12 integer pixels, and align the integer pixels according to the locations of the motion vectors of integer pixels in the pixel words, thereby truncating two invalid integer pixels.

The half pixel estimation unit 152 may comprise 8 parallel processing elements PE21~PE28, and the processing elements PE21~PE28 are divided into 3 groups. The first group comprises the processing elements PE21~PE24, configured to calculate SAD values of four candidate half pixels in the diagonal direction. The second group comprises the processing elements PE25 and PE26, configured to calculate SAD values of two candidate half pixels in the vertical direction. The third group comprises the processing elements PE27 and PE28, configured to calculate SAD values of two candidate half pixels in the horizontal direction. When the half pixel estimation unit 152 calculates interpolation of half pixels in the first row, the half pixel estimation unit 152 may broadcast the pixels of the current macroblock stored in the register array RA10 to the processing elements PE23, PE24 and PE26 through a first broadcasting path, and broadcast the pixels of the current macroblock stored in the register array RA11 to the processing elements PE21, PE22, PE25, PE27 and PE28 through a second broadcasting path. Then, When the half pixel estimation unit 152 has completed calculation of interpolation of half pixels in a row, the broadcasting paths from the register arrays RA10 and RA11 may be interchanged. The nine half pixels d0~d8 in the diagonal direction generated by the half pixel estimation unit 152 are divided into two groups. For example, the half pixels d0~d7 are transmitted to the processing elements PE21 and PE23, and the half pixels d1~d8 are transmitted to the processing elements PE22 and PE24. Similarly, the nine half pixels h0~h8 in the horizontal direction generated by the half pixel estimation unit 152 are divided into two groups. For example, the half pixels h0~h7 are transmitted to the processing element PE27, and the half pixels h1~h8 are transmitted to the processing element PE28. In addition, the eight half pixels v0~v7 in the vertical direction generated by the half pixel estimation unit 152 are transmitted to the processing elements PE25 and PE26 simultaneously.

In an embodiment, each processing element in the half pixel estimation unit 152 may comprise four SAD calculating units and an accumulator (as shown in FIG. 7), and it may take two clock cycles to complete calculation of SAD values of half pixels in a line. The half pixel estimation unit 152 may accumulate the SAD values of half pixels in 8 lines to obtain eight $SAD_{8\times8}$ values. The half pixel estimation unit 152 may select the least $SAD_{8\times8}$ value of half pixels by using the comparators, and compare the least $SAD_{8\times8}$ value of half pixels with the least $SAD_{8\times8}$ value of integer pixels, thereby obtaining the resulting motion vector $MV_{8\times8}$ (i.e. the least $SAD_{8\times8}$ value after comparison).

The half pixel estimation unit 152 may sum up the four $SAD_{8\times8}$ values corresponding to each of the 8 candidate half pixels, thereby obtaining 8 $SAD_{16\times16}$ values. Then, the half pixel estimation unit 152 may select the least $SAD_{16\times16}$ value of half pixels by using the comparators, and compare the least $SAD_{16\times16}$ value of half pixels with the least $SAD_{16\times16}$ value of integer pixels, thereby obtaining the resulting motion vector $MV_{16\times16}$ (i.e. the least $SAD_{16\times16}$ value after comparison).

G. Definition of Loop Filtering Sequence

Encoding processes and decoding processes in video codec standards, such as the H.264 or VC-1 standards, are controlled in a frame level flow, and the order for processing the boundary in the in-loop filtering processes are defined in the video codec standards. In addition, the hardware accelerators in the encoding module 120 may perform the encoding process by macroblock. In the invention, a filtering order of the boundary of 4×4 blocks in a 16×16 macroblock is further defined based on the definition in the video codec standards, thereby using the overlapped portion of neighboring macroblocks effectively to reduce the memory bandwidth for accessing the external storage unit 130.

It should be noted that an in-loop filter is a necessary component in a video encoding system and a video decoding system for the H.264 and VC-1 standards. The in-loop filter may reduce the discontinuity between neighboring macroblocks generated by the processes, such as DCT/iDCT and quantization/inverse quantization, thereby enhancing the image quality after motion compensation and increasing the efficiency for video encoding.

Figure 18:
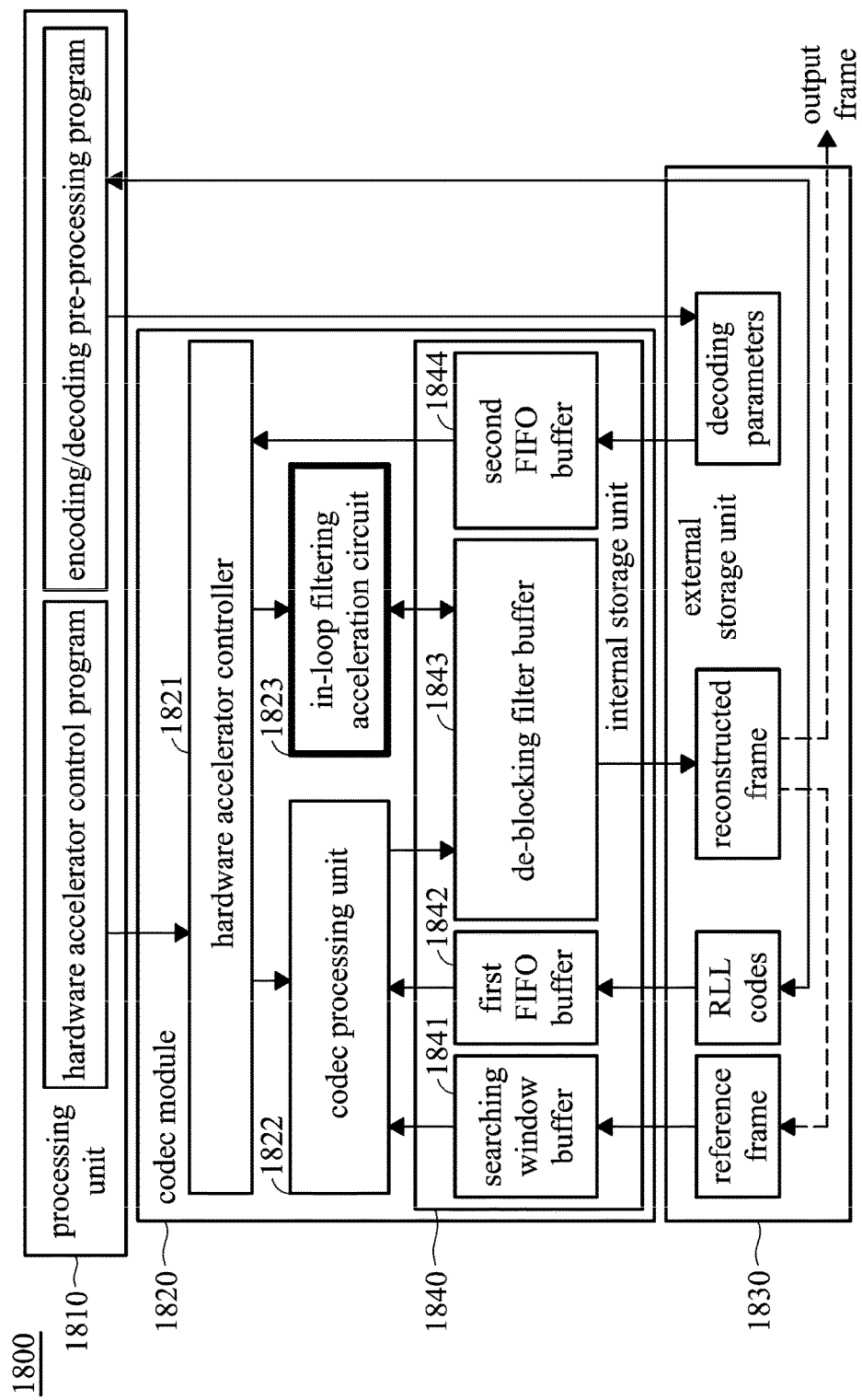
FIG. 18 is a block diagram illustrating a video codec system according to an embodiment of the invention.

FIG. 18 is a block diagram illustrating a video codec system according to an embodiment of the invention. Referring to FIG. 1 and FIG. 18, the in-loop filtering acceleration circuit 124 is not only applied in the video encoding system 100, but also applied in a video codec system 1800. The video codec system 1800 may comprise a processing unit 1810, a codec module 1820, and an external storage unit 1830. The processing unit 1810 may be a controller, configured to execute a hardware acceleration control program, and execute decoding pre-processing and post-processing, such as an entropy decoding program and a decoding parameters calculating program, respectively. For example, the processing unit 1810 may be a central processing unit (CPU), a digital signal processor (DSP) or other equivalent circuits implementing the same functions.

The codec module 1820 may comprise a hardware accelerator controller 1821, a codec processing unit 1822, an in-loop filtering acceleration circuit 1823, an external storage unit 1830 and an internal storage unit 1840. In an embodiment, the codec processing unit 1822 can be implemented by hardware circuits (i.e. hardware) or DSPs (i.e. software) configured to perform decoding processes, such as motion compensation, intra-frame prediction, inverse DCT, inverse quantization and zig-zag scan. The functionality of the in-loop filtering acceleration circuit 1823 is identical to that of the in-loop filtering acceleration circuit 124, and the details will not be described here. In the following sections, only the details of the in-loop filtering acceleration circuit 124 will be described.

The external storage unit 1830 is configured to store reference frames, reconstructed frames, decoding parameters, and RLL codes. The external storage 1830 may be a volatile memory component (e.g. random access memory, such as DRAM or SRAM) and/or a non-volatile memory component (e.g. ROM, hard disk, CDROM).

The internal storage unit 1840 may comprise a searching window buffer 1841, a first FIFO buffer 1842, a de-blocking filter buffer 1843, and a second FIFO buffer 1844. The searching window buffer 1841 is configured to store reference macroblocks for motion compensation. The first FIFO buffer 1842 is configured to store RLL codes. The de-blocking filter buffer 1843 is configured to store reconstructed macroblocks after motion compensation executed by the codec processing unit 1822, and filtered macroblocks generated by the in-loop filtering acceleration circuit 1823. In addition, the in-loop filtering acceleration circuit 1823 may read the reconstructed macroblocks generated by the codec processing unit 1822 from the de-blocking filter buffer 1843, perform in-loop filtering to the reconstructed macroblocks, and write the filtered macroblocks into the de-blocking filter buffer 1843. The second FIFO buffer 1844 is configured to store decoding parameters generated by the processing unit 1810.

G-1. In-Loop Filtering Sequence in H.264 Standard

Figure 10:
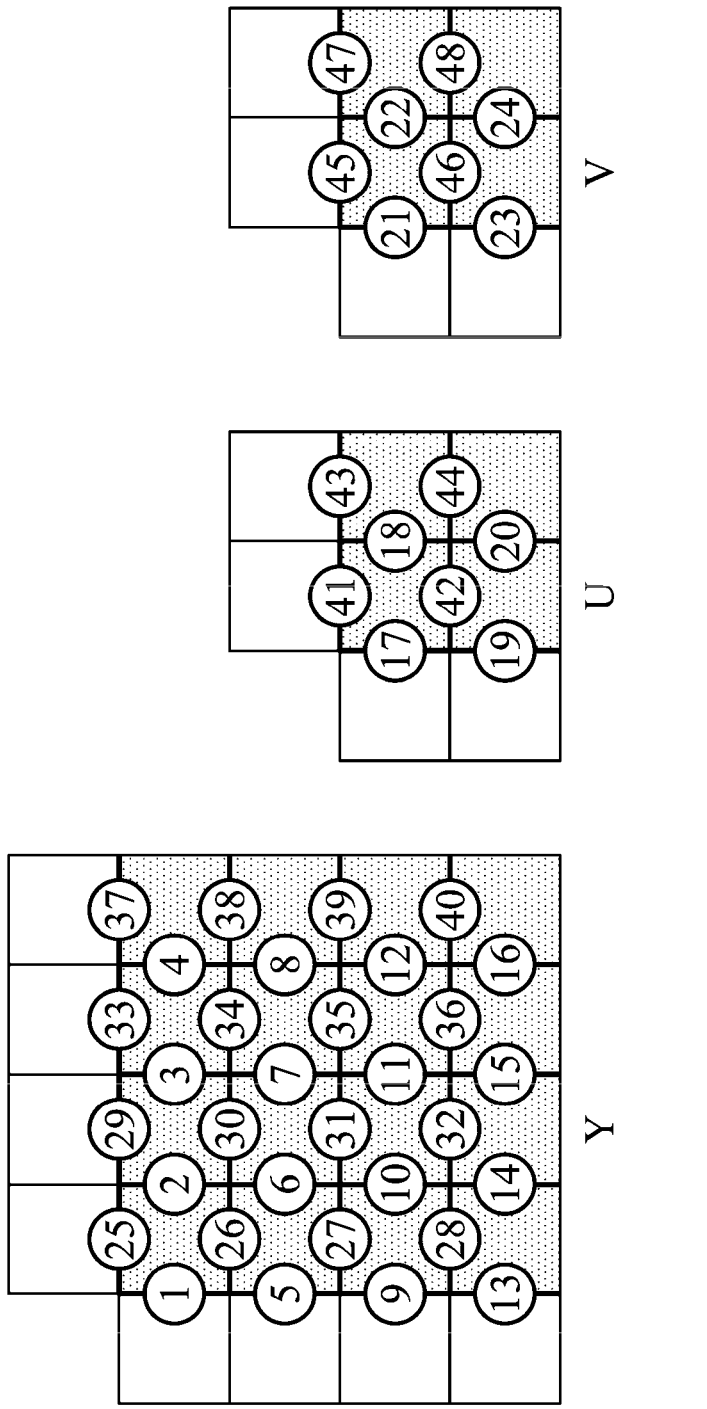
FIG. 10 is a diagram illustrating the in-loop filtering sequence in the H.264 standard according to an embodiment of the invention.

FIG. 10 is a diagram illustrating the in-loop filtering sequence in the H.264 standard according to an embodiment of the invention. As illustrated in FIG. 10, Y denotes a luminance macroblock, and U and V denote a respective chrominance macroblock. The filtering sequence for an in-loop filter in the H.264 standard is defined as following: for each frame, the vertical edges of all 4×4 blocks are filtered first, and the vertical edges are filtered from top to bottom and from left to right. Then, the horizontal edges of all 4×4 blocks are filtered, and the horizontal edges are also filtered from top to bottom and from left to right.

The in-loop filtering acceleration circuit 124 may perform video encoding/decoding by macroblock, and the edges to be filtered in each macroblock are the black bold lines illustrated in FIG. 10. The blocks filled with diagonal lines represent the current luminance macroblock and current chrominance macroblocks, and the white blocks represent neighboring luminance macroblocks and neighboring chrominance macroblocks of the current luminance macroblock and current chrominance macroblocks, respectively.

Figure 14A:
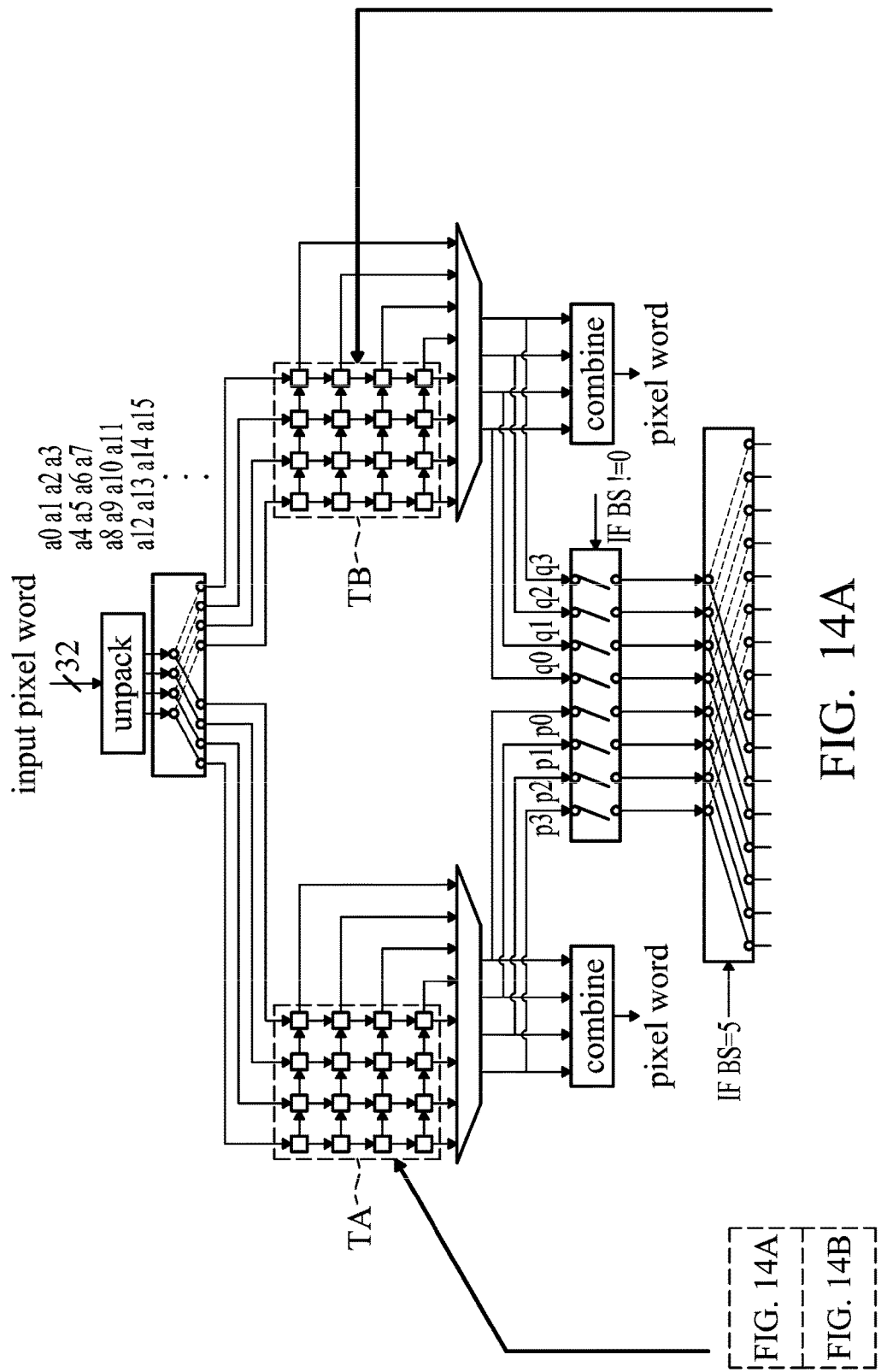
FIGS. 14A and 14B are portions of a diagram illustrating the hardware architecture of the in-loop filtering acceleration circuit 124 according to an embodiment of the invention.

Based on the filtering sequence defined in the H.264 standard, the in-loop filtering acceleration circuit 124 may re-define the filtering sequence for filtering edges of 4×4 blocks in a 16×16 macroblock as the order of numbers illustrated in FIG. 10. First, the in-loop filtering acceleration circuit 124 may filter the vertical edges of all 4×4 blocks from left to right and from top to bottom, and filter the horizontal edges of all 4×4 blocks from top to bottom and from left to right. Briefly, the in-loop filtering acceleration circuit 124 may use the neighboring macroblocks having overlapped edges effectively to reduce the memory bandwidth for accessing the external storage unit 130 by using the filtering sequence defined for the H.264 standard in the invention. For example, when filtering a vertical edge of a 4×4 block, the in-loop filtering acceleration circuit 124 may read two 4×4 blocks located at the left/right side of the vertical edge from the de-blocking filter buffer 145, and write the two 4×4 blocks to the transposition register arrays TA and TB (as shown in FIG. 14A, and details will be described later). When the in-loop filtering acceleration circuit 124 has completed filtering of a vertical edge, it is not necessary for the in-loop filtering acceleration circuit 124 to write the 4×4 block, which is located at the right side of the vertical edge, back to the de-blocking filter buffer 145. That is, the 4×4 block can be preserved in the de-blocking filter buffer 145, so that the 4×4 block can be used as the macroblock located at the left side of the next vertical edge. Accordingly, accessing (i.e. writing and reading) of a 4×4 block can be saved when the in-loop filtering acceleration circuit 124 performs filtering to a vertical edge. Similarly, another accessing operation (i.e. writing and reading) of a 4×4 block can be saved when the in-loop filtering acceleration circuit 124 performs filtering to a horizontal edge.

G-2. In-Loop Filtering Sequence in VC-1 Standard

FIG. 11 is a diagram illustrating the filtering sequence for an in-loop filter in the VC-1 standard according to an embodiment of the invention. As illustrated in FIG. 11, Y denotes a luminance macroblock, and U and V denote a respective chrominance macroblock. For each frame, the filtering sequence in the in-loop filter defined by the VC-1 standard can be expressed as the following criteria of:

(a) horizontal edges of all 8×8 blocks are filtered from left to right and from top to bottom;

(b) horizontal edges of all 4×4 blocks are filtered from left to right and from top to bottom;

(c) vertical edges of all 8×8 blocks are filtered from top to bottom and from left to right; and (d) vertical edges of all 4×4 blocks are filtered from top to bottom and from left to right.

When the in-loop filtering acceleration circuit 124 encodes or decodes a frame by macroblock, some edges of the current macroblock are not filtered by the in-loop filtering acceleration circuit 124 due to the limitation of the filtering sequence of the VC-1 standard, wherein the limitation may indicate that the right edge and the bottom edge are not filtered while performing in-loop filtering for each macroblock. Accordingly, the edges can only be filtered while the in-loop filtering acceleration circuit 124 performs filtering of the next macroblock or the macroblock exactly on the next line (i.e. the line beneath the current line). Therefore, when the in-loop filtering acceleration circuit 124 performs filtering of each macroblock, the edges to be filtered may comprise some internal edges of the current macroblock, and some edges of the up, left, and upper-left neighboring macroblocks, such as the black bolded lines illustrated in FIG. 11. In addition, the blocks filled with diagonal lines are the luminance macroblock and chrominance macroblocks of the current macroblock, and the white blocks are the luminance macroblock and chrominance macroblocks of the neighboring macroblocks.

Based on the filtering sequence defined in the VC-1 standard, the in-loop filtering acceleration circuit 124 may re-define the filtering sequence for filtering edges of 4×4 blocks in a 16×16 macroblock as the order of numbers illustrated in FIG. 11. First, the in-loop filtering acceleration circuit 124 may filter horizontal edges. That is, the in-loop filtering acceleration circuit 124 may filter the horizontal edges of 8×8 blocks from bottom to top, and filter the horizontal edges of 4×4 blocks from top to bottom. Then, the in-loop filtering acceleration circuit 124 may filter vertical edges. That is, the in-loop filtering acceleration circuit 124 may filter the vertical edges of 8×8 blocks from right to left, and filter the vertical edges of 4×4 blocks from left to right. Briefly, the in-loop filtering acceleration circuit 124 may use the neighboring macroblocks having overlapped edges effectively to reduce the memory bandwidth for accessing the external storage unit 130 by using the filtering sequence re-defined for the VC-1 standard in the invention.

H. Storage Format of Pixels for In-Loop Filtering

The reconstructed macroblocks generated by the in-loop filtering acceleration circuit 124 may compose a reconstructed frame, which is stored in the external storage unit 130. The pixels of the reconstructed macroblocks before in-loop filtering and pixels of the macroblocks after in-loop filtering are stored in the de-blocking filter buffer 145 of the internal storage unit 140 with the format of pixel words (e.g. word32 format). Briefly, each pixel has an 8-bit accuracy, and four horizontally adjacent pixels are placed into the same pixel word. Before performing in-loop filtering, the DCT and quantization accelerator 123 may write the reconstructed macroblock after motion compensation or spatial compensation into the de-blocking filter buffer 145. Then, the hardware accelerator controller 121 may read the required neighboring macroblocks for in-loop filtering from the external storage unit 130, and write the macroblocks into the de-blocking filter buffer 145. When in-loop filtering has completed, the hardware accelerator controller 121 may copy the reconstructed macroblocks and neighboring macroblocks after in-loop filtering to the external storage unit 130 by using the DMA controller 160.

Figure 12:
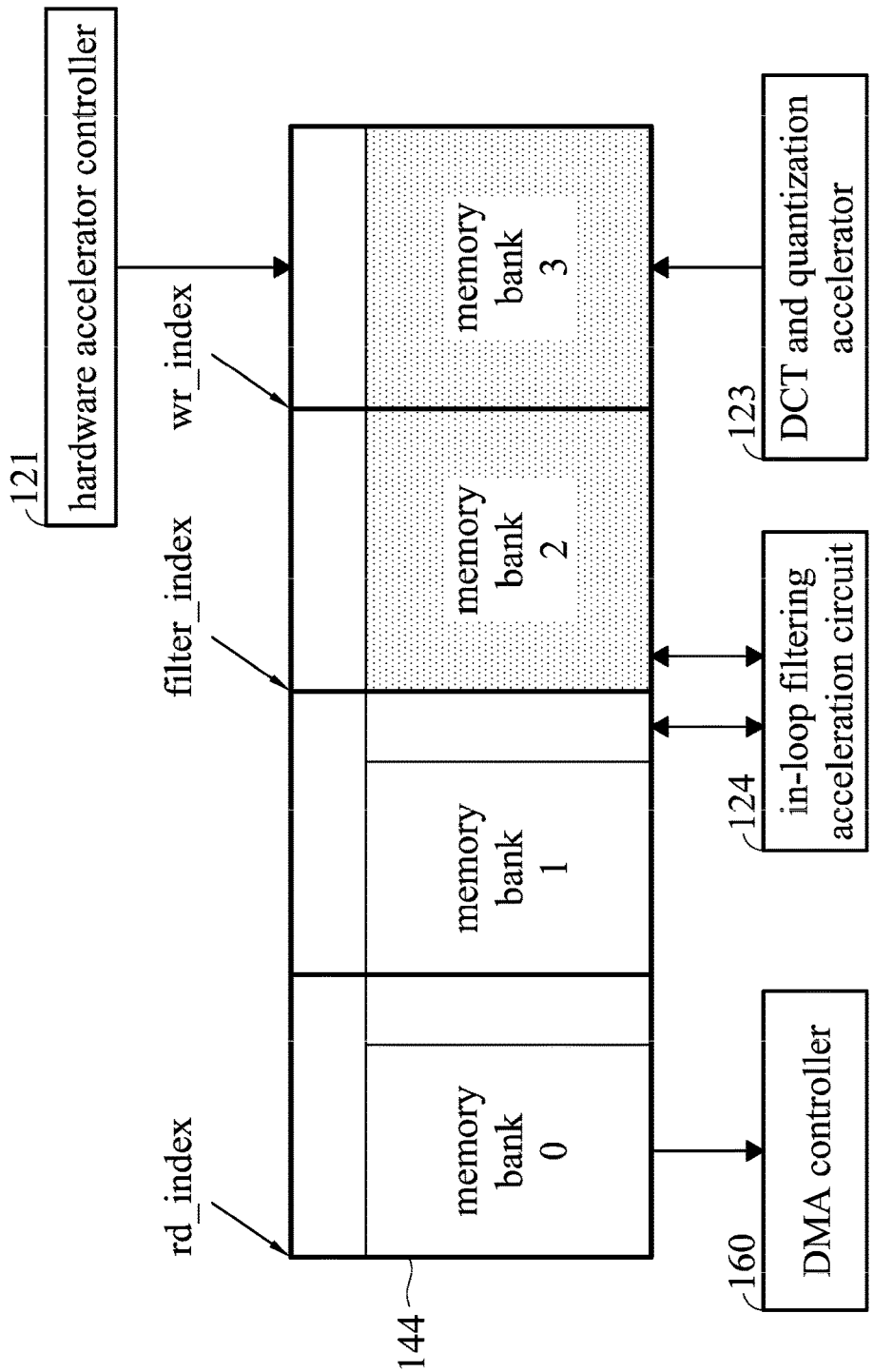
FIG. 12 is a diagram illustrating the architecture of the de-blocking filter buffer 145 according to an embodiment of the invention.

Referring to FIG. 10 and FIG. 11, left, upper, and upper-left neighboring macroblocks of the current macroblock are used while performing in-loop filtering for the current macroblock. FIG. 12 is a diagram illustrating the architecture of the de-blocking filter buffer 145 according to an embodiment of the invention. For convenience to read neighboring macroblocks, the de-blocking filter buffer 145 may have an architecture of four memory banks, so that the operations of reading, writing and filtering macroblocks can be executed in parallel to increase performance of the video encoding system 100. Each memory bank may store the current macroblock and certain lines of luminance/chrominance pixels above the current macroblock. For example, the de-blocking filter buffer 145 may store four lines of luminance/chrominance pixels above the current macroblock for the H.264 standard. Alternatively, the de-blocking filter buffer 145 may store 8 lines of luminance/chrominance pixels above the current macroblock for the VC-1 standard. Two neighboring memory banks (e.g. memory banks 1 and 2) in the de-blocking filter buffer 145 are configured to store the current macroblock, the left neighboring macroblock, and two upper neighboring luminance and chrominance macroblocks, and the in-loop filtering acceleration circuit 124 may read the two neighboring memory banks simultaneously to perform the in-loop filtering process. Other hardware accelerators or the DSP processor (e.g. DCT and quantization unit 123) in the encoding module 120 may write the reconstructed macroblocks into a memory bank (e.g. memory bank 3) of the de-blocking filter buffer 145. In addition, the hardware accelerator controller 121 may further read the upper neighboring macroblock of the reconstructed macroblock from the external storage unit 130, and write the upper neighboring macroblock into a memory bank (e.g. memory bank 3) of the de-blocking filter buffer 145. Also, the hardware accelerator controller 121 may further copy the reconstructed macroblock and the upper neighboring macroblock after in-loop filtering, which are stored in a memory bank (e.g. memory bank 0) of the de-blocking filter buffer 145, to the external storage unit 130.

FIGS. 13A~13D are portions of a diagram illustrating the sequence of data accessing in the de-blocking filter buffer 145 according to an embodiment of the invention. In order to perform reading, writing and in-loop filtering of macroblocks simultaneously, different hardware accelerators or the DSP processor of the encoding module 120 should access different memory banks of the de-blocking filter buffer 145 circularly via the DMA controller 160, as illustrated in FIGS. 13A~13D. In order to synchronize reading, writing and in-loop filtering of macroblocks, three different indices are used in the de-blocking filter buffer 145 to prevent different hardware accelerators and the DMA controller 160 from accessing the same memory bank of the de-blocking filter buffer 145. The three aforementioned indices, such as a reading index rd_index, a filter index filter_index, and a writing index wr_index, are configured to control different hardware accelerators and the DMA controller 160 to access different memory banks of the de-blocking filter buffer 145. The control mechanism of the indices can be expressed in the following steps:

(a) When the reading index rd_index is pointing to a memory bank accessed by the DMA controller 160, the reading index rd_index is set to 0. When (rd_index+1) is smaller than the filter index filter_index, the DMA controller 160 may read the memory bank to which the reading index rd_index is pointing. Every time when the DMA controller 160 has completed reading a macroblock and its upper neighboring macroblock, the DMA controller 160 may add the reading index rd_index by 1.

(b) When the filter index filter_index is directing to a memory accessed by the in-loop filtering acceleration circuit 124, the filter index filter_index is set to 0. When the filter index filter_index is smaller than the writing index wr_index, the in-loop filtering acceleration circuit 124 may access two memory banks directed to by filter_index and (filter_index−1). Every time when the in-loop filtering acceleration circuit 124 has completed in-loop filtering of a macroblock, the in-loop filtering acceleration circuit 124 may add the filter index filter_index by 1.

(c) When the writing index wr_index is pointing to the memory bank read by other hardware accelerators, the DSP processor, and the hardware accelerator controller 121, the writing index wr_index is set to 0. When the writing index wr_index is larger than (rd_index+2), other hardware accelerators/the DSP processor, and the hardware accelerator controller 121 may write macroblock data to the memory bank to which the writing index wr_index is pointing. Every time when other hardware accelerators/the DSP processor and the hardware accelerator controller 121 have completed writing of a macroblock and its upper neighboring macroblock, the aforementioned components may add the writing index wr_index by 1.

I. Hardware Architecture of In-Loop Filtering Acceleration Circuit

Figure 14B:
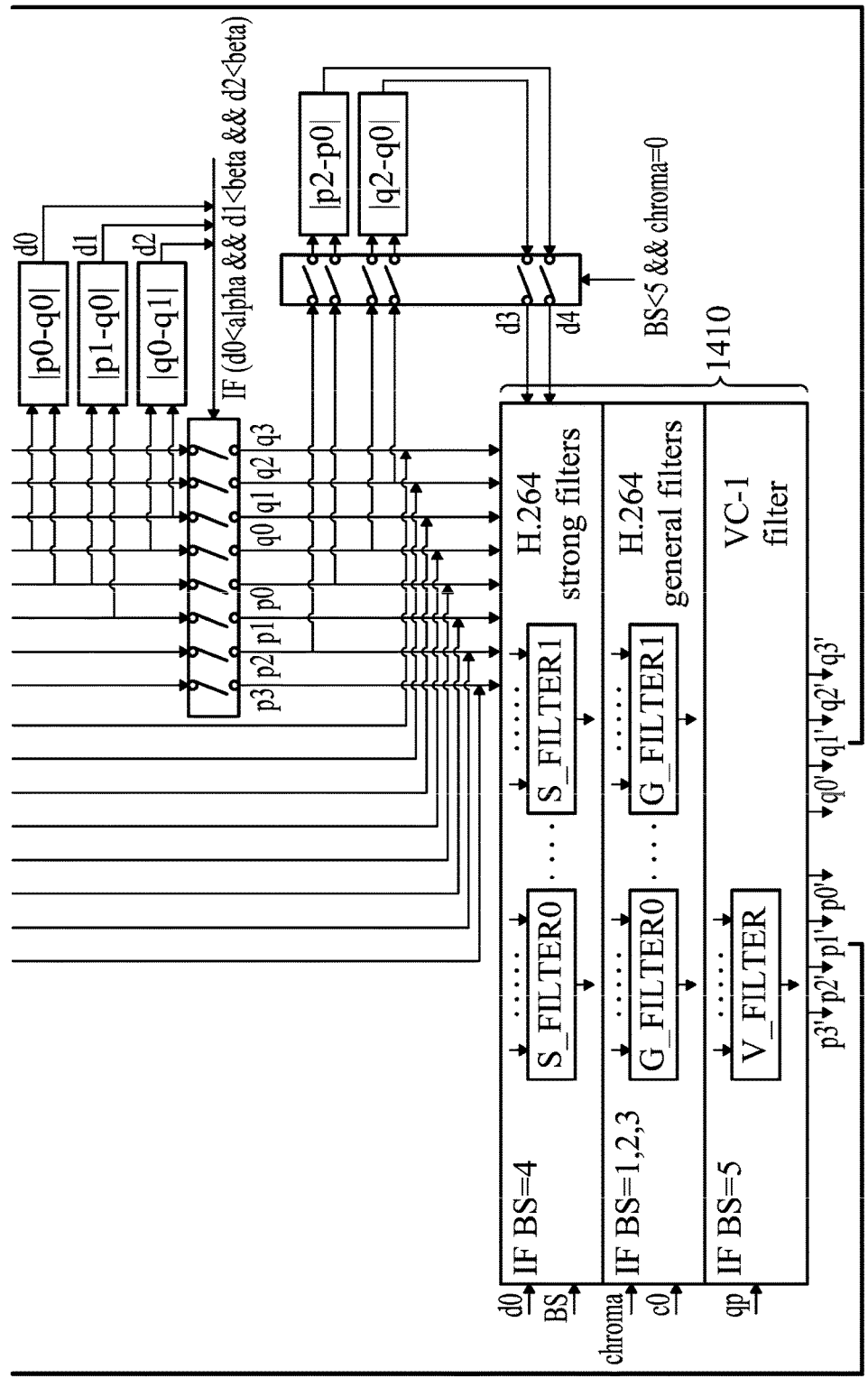

FIGS. 14A and 14B are portions of a diagram illustrating the hardware architecture of the in-loop filtering acceleration circuit 124 according to an embodiment of the invention. In the invention, the filtering parameter, such as boundary strength (BS), in the H.264 standard is calculated by the processing unit 110. In addition, the processing unit 110 may control the in-loop filtering acceleration circuit 124 by the hardware accelerator controller 121. For the VC-1 standard, the processing unit 110 may determine whether each edge should be filtered or not. For the H.264 standard, 5 levels of boundary strength, such as BS=0~4, are defined for edges of a macroblock. However, boundary strength is not defined in the VC-1 standard, and thus there are only two conditions, specifically, to be filtered or not, for each edge in the VC-1 standard. For convenience in selecting the type of filters, two cases of boundary strength are defined for the VC-1 standard in the invention. That is, if the processing unit 110 determines that the edge should be filtered, the value of boundary strength is set to 0. Conversely, if the processing unit 110 determines that the edge should not be filtered, the value of boundary strength is set to 5. Accordingly, the in-loop filtering acceleration circuit 124 only has to read macroblock data from the de-blocking filter buffer 145, and select an appropriate one-dimensional (1D) filter according to filtering parameters, such as the value of boundary strength, to perform in-loop filtering of the corresponding edge.

As illustrated in FIGS. 14A and 14B, the in-loop filtering acceleration circuit 124 may comprise two transposition register arrays TA and TB, a filter selection unit 1410, and multiple 1D filters (e.g. G_FILTER0~G_FILTER1, S_FILTER0~S_FILTER3 and V_FILTER). Since the reconstructed macroblock to be filtered is stored in the de-blocking filter buffer 145 with a format of pixel words, the in-loop filtering acceleration circuit 124 may read one pixel word from the de-blocking filter buffer 145 every clock cycle, unpack the pixel word into four pixels, and write the four pixels into the transposition register arrays TA and TB. Accordingly, only four clock cycles are taken for the in-loop filtering acceleration circuit 124 to read pixels of a 4×4 block from the de-blocking filter buffer 145 to the transposition register arrays TA and TB. Pixels should be read column by column or row by row while filtering horizontal edges and vertical edges, respectively. However, the accessing of the de-blocking filter buffer 145 is more effective only when data is read or written row by row. The in-loop filtering acceleration circuit 124 may read pixels in a 4×4 block column by column, or row by row, freely by using the transposition register arrays TA and TB, so that the same hardware circuit (e.g. 1D filter) can be used to filter horizontal edges and vertical edges. When two 4×4 blocks are written into the transposition register arrays TA and TB, the in-loop filtering acceleration circuit 124 may start to perform in-loop filtering, and the procedures for in-loop filtering are described as the following steps:

(1) Four pixels p0, p1, p2 and p3 are read from the transposition register array TA and four pixels q0, q1, q2 and q3 are read from the transposition register array TB column by column or row by row according to the current filtering direction (e.g. horizontal direction or vertical direction). The processing unit 110 may determine the boundary strength of the current edge. If BS=0, the current edge is not filtered, and step (1) is repeated.

(2) If the processing unit 110 determines that the boundary strength BS of the current edge is equal to 5, it may indicate that the filtering process is to filter the current edge in the VC-1 standard, and step (4) is performed to select a 1D filter of the VC-1 standard. Otherwise, step (3) is performed.

(3) The in-loop filtering acceleration circuit 124 may calculate filter selection parameters d0=|p0−q0|, d1=|p1−p0|, and d2=|q0−q1|, and compare the parameters d0~d2 with threshold values $\alpha$ and $\beta$. If the in-loop filtering acceleration circuit 124 determines that the criterion (d0<$\alpha$ && d1<$\alpha$ && d2<$\beta$) does not stand, the current edge is not filtered, and step (1) is performed. If the criterion stands, the in-loop filtering acceleration circuit 124 may further determine whether the current macroblock is a luminance macroblock in the H.264 standard. If so, the in-loop filtering acceleration circuit may calculate filter selection parameters d3=|p2−p0| and d4=|q2−q0|, and step (4) is performed to select a 1D filter of the H.264 standard. If not, step (4) is performed.

(4) The in-loop filtering acceleration circuit 124 may select a 1D filter according to the value of boundary strength to perform filtering of input pixels p0~p3 and q0~q3. When the value of boundary strength BS is 4, the in-loop filtering acceleration circuit 124 may select a H.264 strong filter (S_FILTER). When the value of boundary strength BS is between 1~3, the in-loop filtering acceleration circuit 124 may select a H.264 general filter (G_FILTER). When the value of boundary strength BS is 5, the in-loop filtering acceleration circuit 124 may select a VC-1 filter (V_FILTER). If the filtering of edges has not been completed yet, step (1) is performed. When the filtering of edges has completed, the in-loop filtering acceleration circuit 124 may write output pixels p0'~p3' back to the transposition register array TA, and write output pixels q0'~q3' back to the transposition register array TB.

(5) When the filtering of edges has completed, the in-loop filtering acceleration circuit 124 may write 4×4 blocks, which are above the horizontal edge or located at the left side of the vertical edge, back to the de-blocking filter buffer 145. If a horizontal edge is processed, the in-loop filtering acceleration circuit 124 may read pixels by column, and four adjacent pixels in a column are packed into a pixel word to be written into the de-blocking filter buffer 145. If a vertical edge is processed, the in-loop filtering acceleration circuit 124 may read pixels by row, and four adjacent pixels in a row are packed into a pixel word to be written into the de-blocking filter buffer 145.

In an embodiment, the filter selection unit 1410 of the in-loop filtering acceleration circuit 124 is configured to calculate filter selection parameters (e.g. d0, d3 and d4) according to the input pixels, select a corresponding 1D filter according to the calculated filter selection parameters. There are three types of 1D filters in the in-loop filtering acceleration circuit 124, such as H.264 strong filters, H.264 general filters, and a VC-1 filter. For example, four filters are included in the H.264 strong filters, such as S_FILTER0, S_FILTER1, S_FILTER2, and S_FILTER3. Two filters are included in the H.264 general filters, such as G_FILTER0 and G_FILTER1, Only one filter V_FILTER is included in the VC-1 filter. The parameters received by the filter selection unit 1410 may comprise boundary strength BS, a chrominance parameter chroma, a clipping parameter c0, a bit rate parameter alpha, a quantization parameter PQuant, and filter selection parameters d0, d3 and d4. For example, the boundary strength BS is determined by the processing unit 110. The chrominance parameter chroma may indicate that the current macroblock is a luminance macroblock or a chrominance macroblock. If the chrominance parameter chroma is 1, it may indicate that the current macroblock is a chrominance macroblock. Otherwise, it may indicate that the current macroblock is a luminance macroblock. Further, c0 is a clipping parameter, which is obtained from a look-up table according to the boundary strength BS, used in H.264 general filters. Also, alpha is a bit rate parameter generated by the processing unit 110 while decoding a bitstream. The quantization parameter PQuant is generated by the processing unit 110. As described in the aforementioned embodiment, the filter selection unit 1410 of the in-loop filtering acceleration circuit 124 may calculate filter selection parameters d0, d3 and d4 according to the input pixels.

Figure 15A:
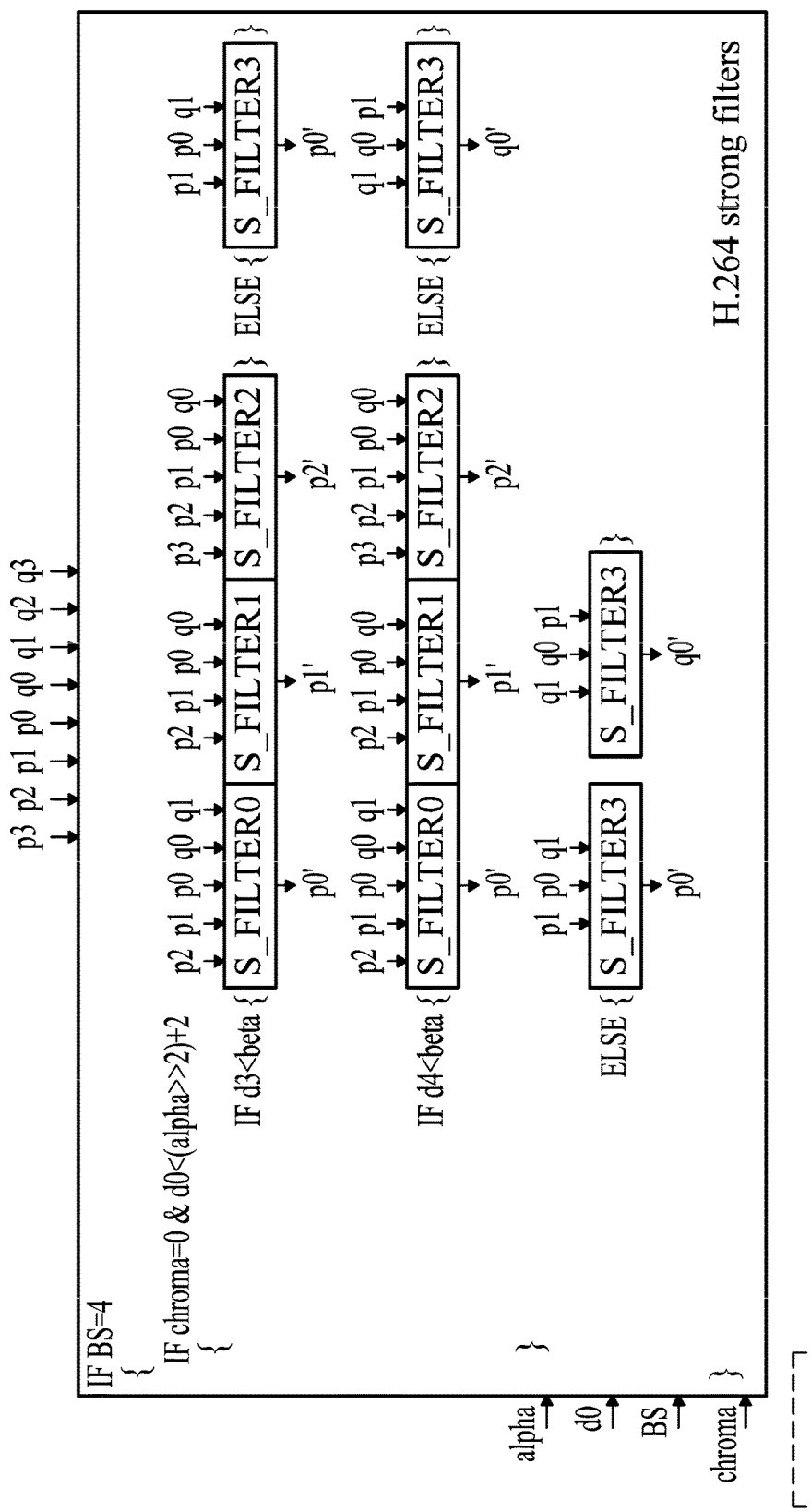
FIGS. 15A and 15B are diagrams illustrating the working principle of the filter selection unit 1410 according to an embodiment of the invention.
Figure 15B:
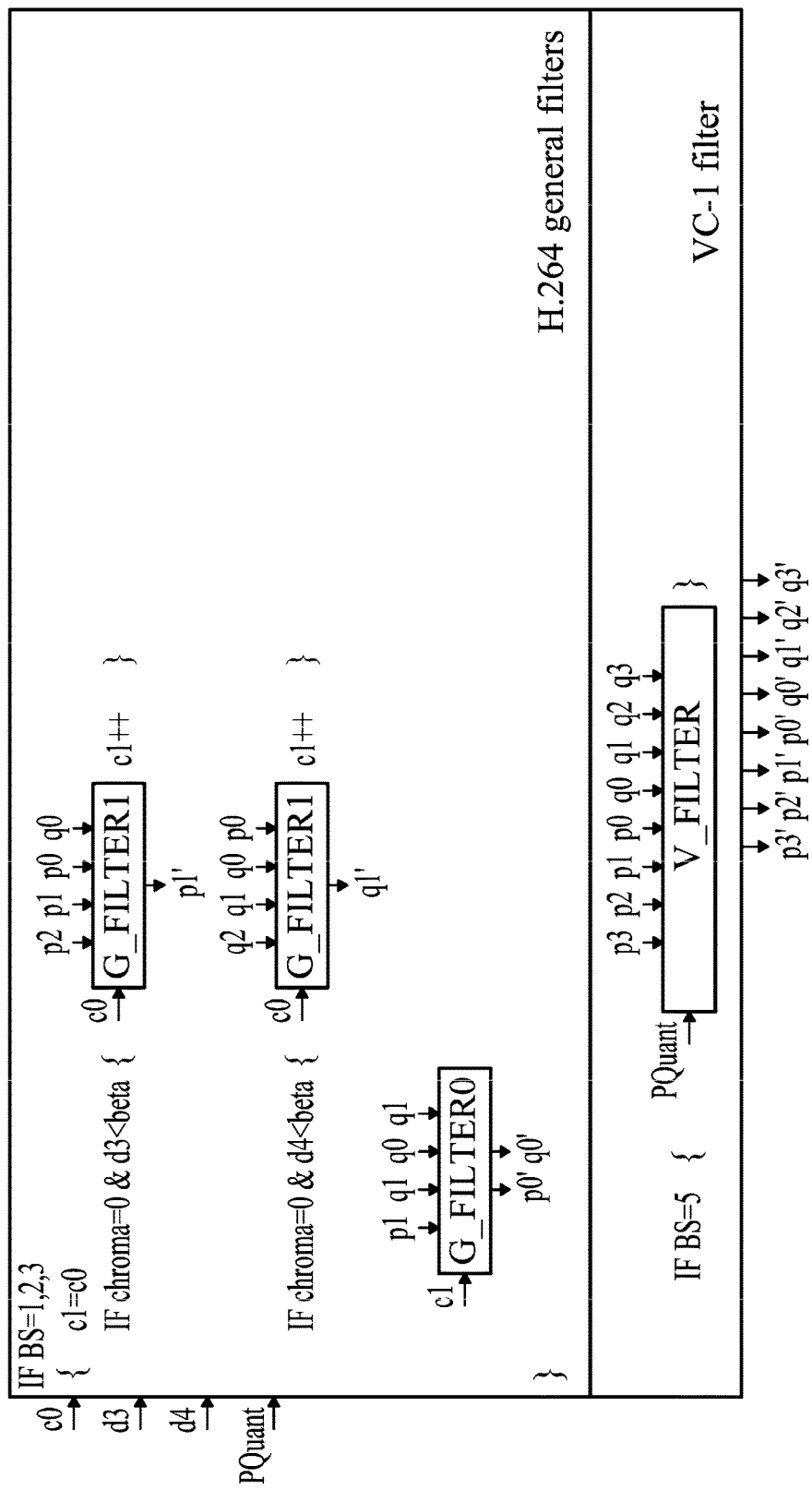
Figure 16B:
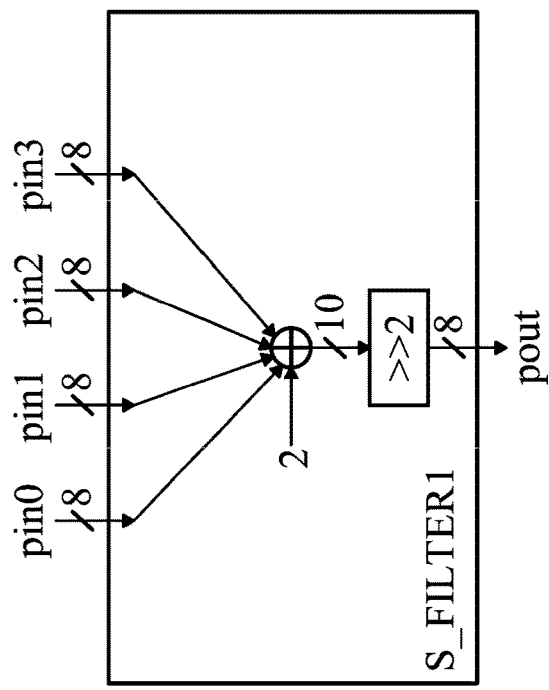
FIGS. 16A~16F are diagrams illustrating the architecture of each H.264 1D filter according to an embodiment of the invention.
Figure 16A:
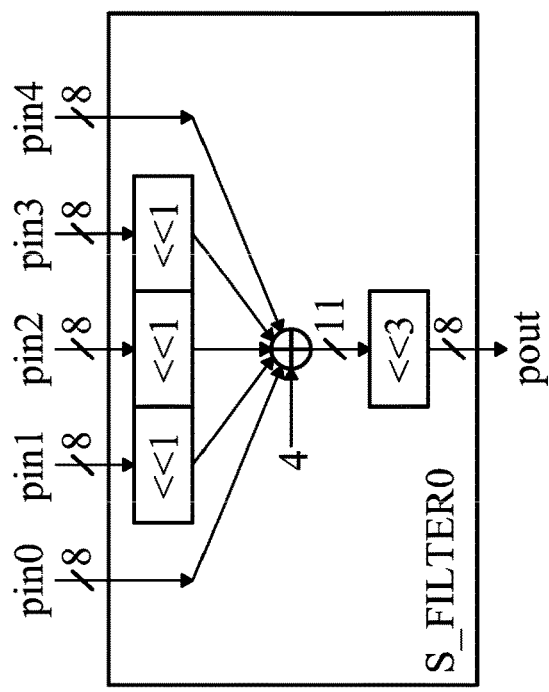
Figure 16D:
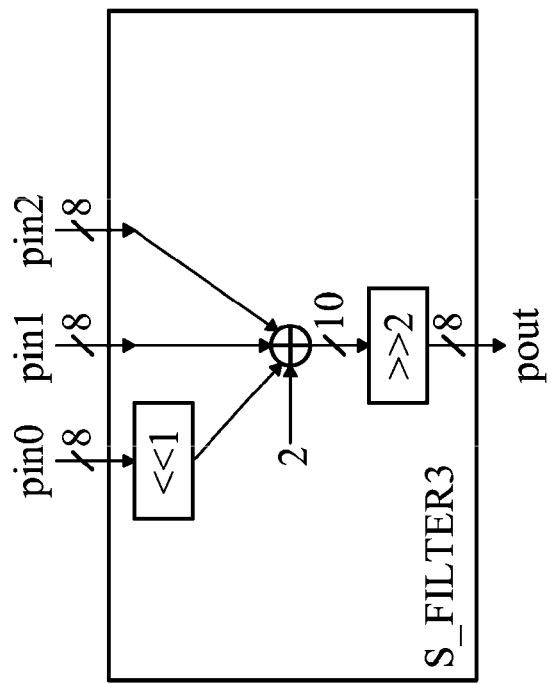
Figure 16C:
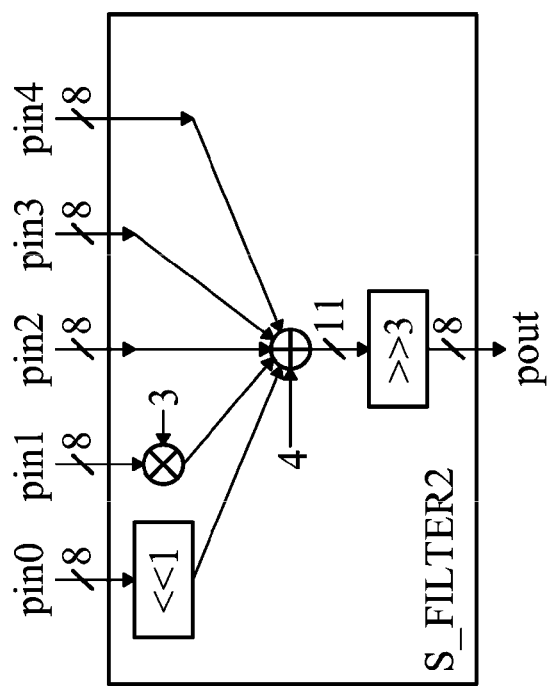
Figure 16F:
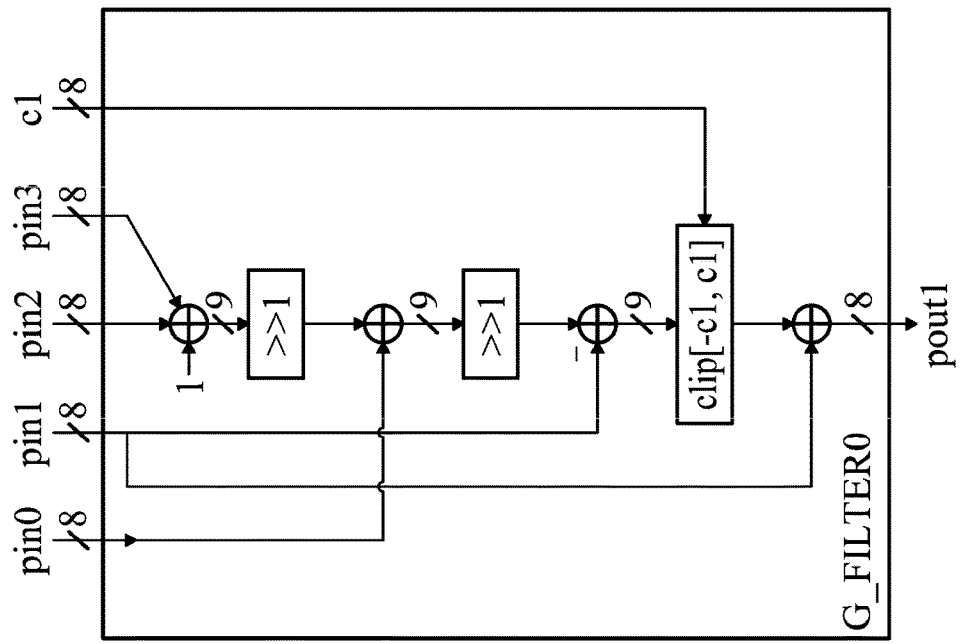
Figure 16E:
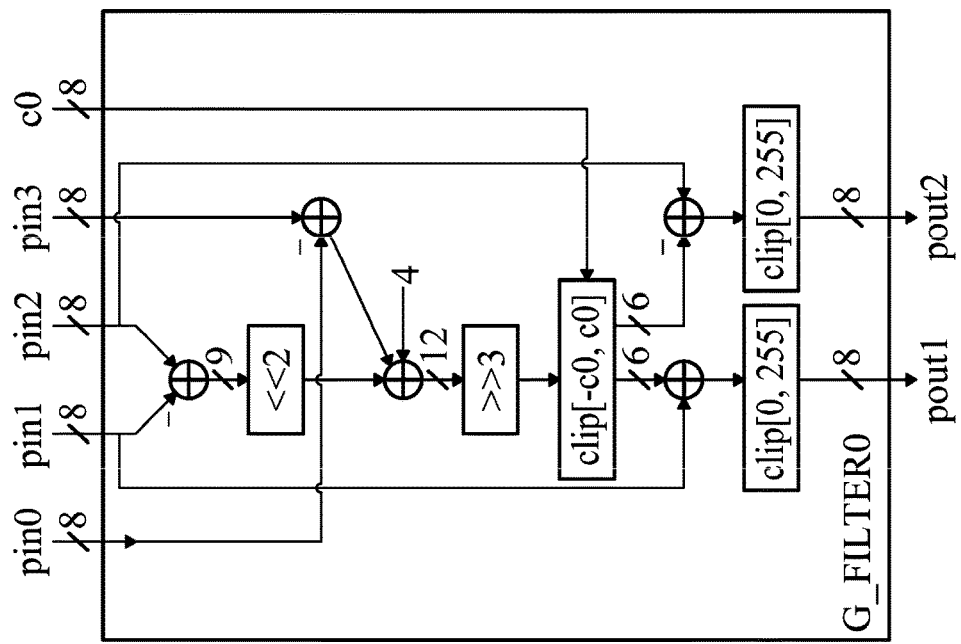

The working principle of the filter selection unit 1410 is shown in FIGS. 15A and 15B. First, the filter selection unit 1410 may select the filter type according to the boundary strength. Then, the filter selection unit 1410 may determine the 1D filter(s) to be used according to other parameters.

FIGS. 16A~16F are diagrams illustrating the architecture of each H.264 1D filter according to an embodiment of the invention. In another embodiment, when the filter selection unit 1410 has determined the 1D filter(s) to be used, the in-loop filtering acceleration circuit 124 may start to perform filtering. It should be noted that a filtering procedure is generally completed by a certain amount of 1D filters. Each 1D filter may select a portion of input pixels p0~p3 and q0~q3 as an input, and perform calculation of the selected input pixels to obtain 1 or 2 results (i.e. filtered pixels), and substitute one or two pixels of the input pixels with the filtered pixels, thereby generating output pixels (e.g. pout, pout1 or pout2 in FIGS. 16A~16F). Then, the output pixels are written back to the transposition register arrays TA or TB.

Four H.264 strong 1D filters (e.g. S_FILTER0, S_FILTER1, S_FILTER2, and S_FILTER3) and two H.264 general 1D filters (e.g. G_FILTER0 and G_FILTER1) are illustrated in FIGS. 16A~16F, respectively. Each 1D filter comprises a certain amount of adders, shifters and clipping units, wherein pin0~pin4 denote input pins in different 1D filters, and pout, pout1 and pout2 denote the output pixels of the different 1D filters.

Figure 17A:
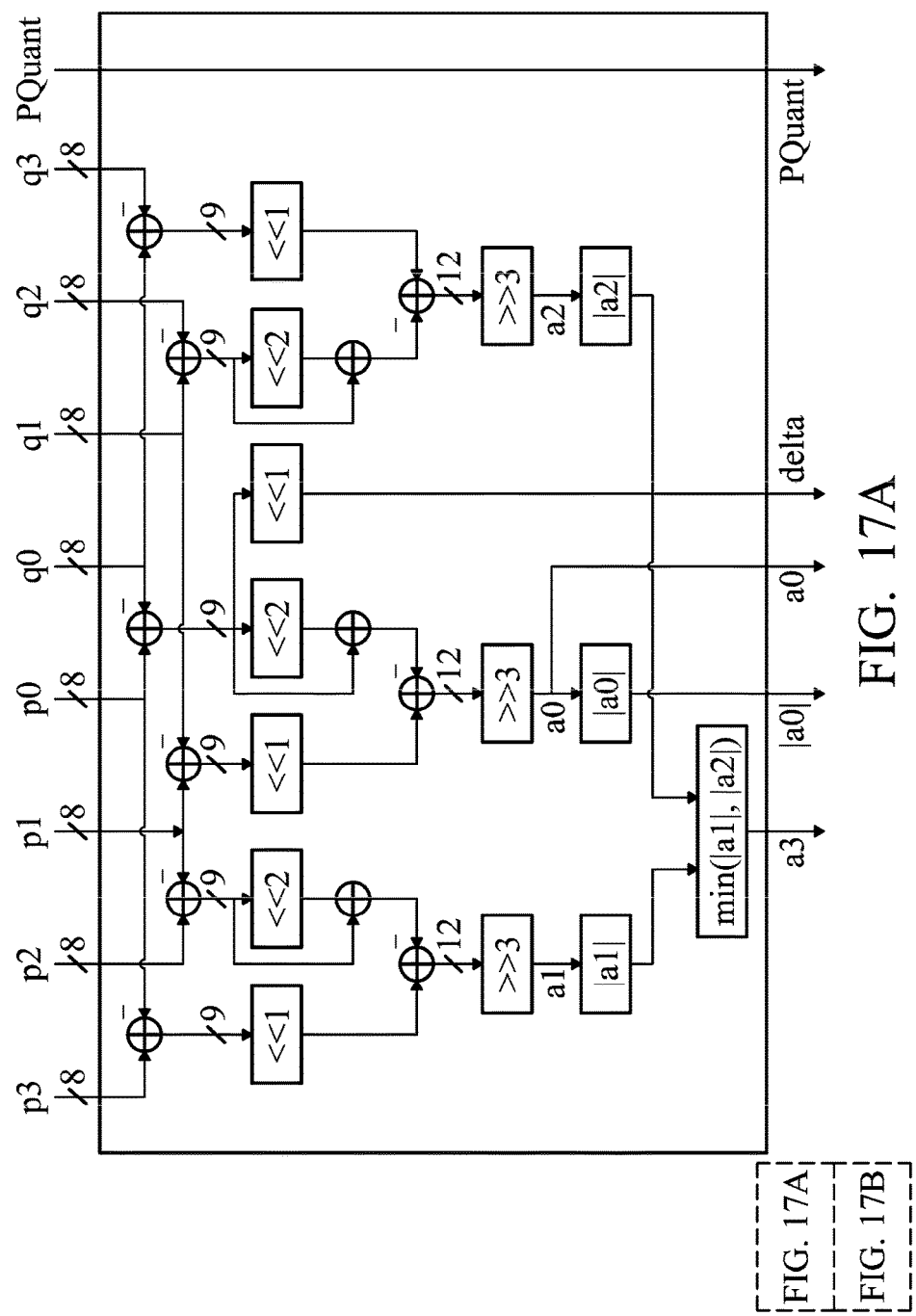
FIGS. 17A~17B are portions of a diagram illustrating the architecture of the VC-1 filter in the in-loop filtering acceleration circuit 124 according to an embodiment of the invention.
Figure 17B:
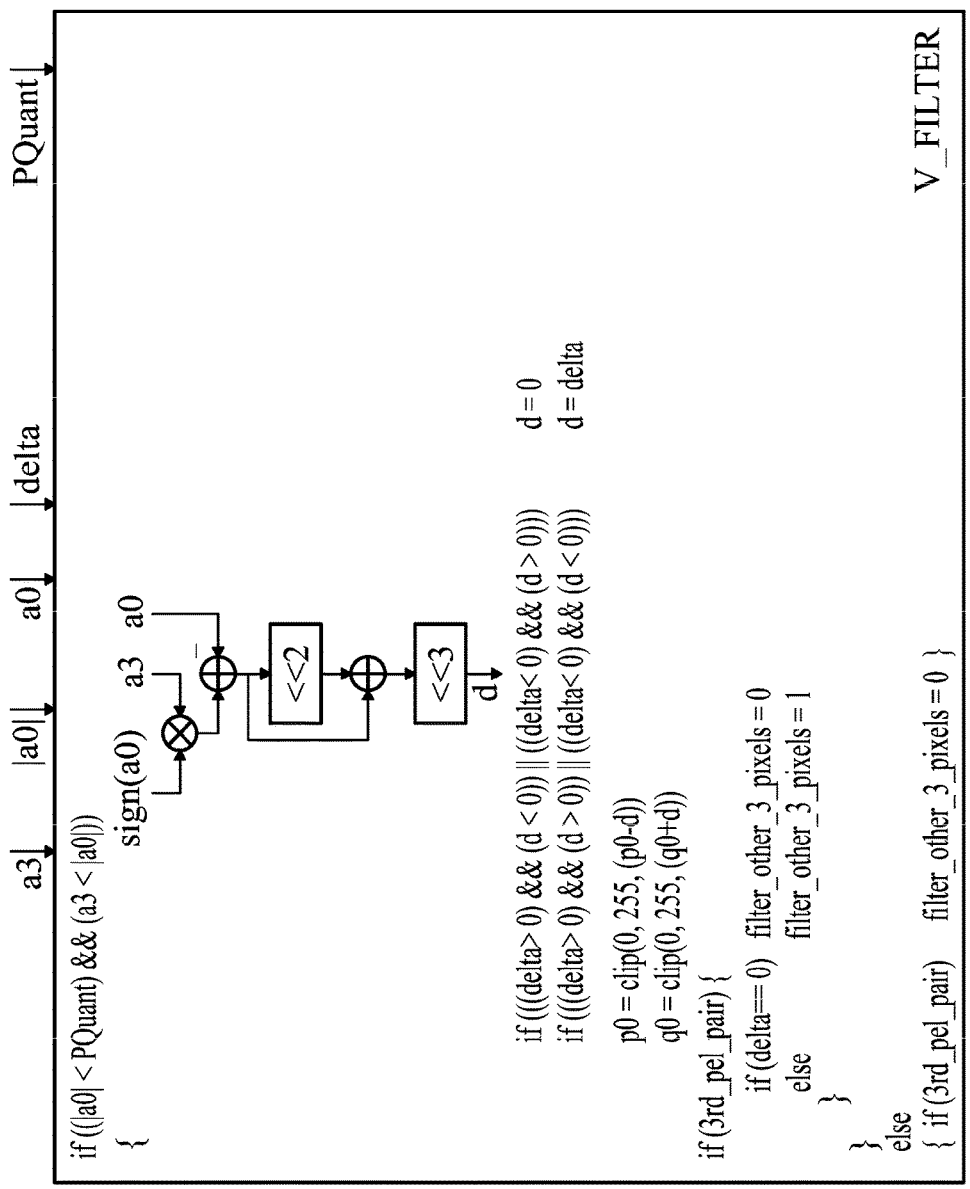

FIGS. 17A~17B are portions of a diagram illustrating the architecture of the VC-1 filter in the in-loop filtering acceleration circuit 124 according to an embodiment of the invention. As illustrated in FIGS. 17A and 17B, the VC-1 filter V_FILTER may comprise two parts. The first part may perform calculation of eight input pixels p0~p3 and q0~q3 to generate four internal parameters a0, |a0|, a3 and delta. The second part may perform filtering by using the four internal parameters and a quantization parameter PQuant to generate two output pixels p0' and q0'. Then, the second part may further substitute the input pixels p0 and q0 with the output pixels p0' and q0', and write the output pixels back to the transposition register arrays TA and TB. When the in-loop filtering acceleration circuit 124 performs filtering of horizontal edges, the horizontal edges of a 4×4 block in the third row should be filtered first. Similarly, when the in-loop filtering acceleration circuit 124 performs filtering of vertical edges, the vertical edges of a 4×4 block in the third column should be filtered first. If the input pixels p0~p3 and q0~q3 are located on the horizontal edge of a 4×4 block in the third row or the vertical edge of a 4×4 block in the third column, the flag 3rd_pel_pair is set to 1. Then, the VC-1 filter should further determine another flag filter_other_3_pixels. If the flag filter_other_3_pixels is 1, pixels in the remaining three rows or columns should be further filtered. Otherwise, the filtering process of the pixels in the remaining three rows or columns can be skipped.

For those skilled in the art, it should be appreciated that the in-loop filtering acceleration circuit 124 is used to perform filtering processes of horizontal edges, vertical edges and diagonal lines. Also, the in-loop filtering acceleration circuit 124 may comply with the H.264 standard (e.g. Baseline profile) and the VC-1 standard (e.g. Simple profile and Main profile). In addition, the 1D filters in the in-loop filtering acceleration circuit 124 can be upgraded to comply with other video codec standards.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video codec system supporting an H.264 and a VC-1 video compression standard, the system comprising:
   a processor configured to perform video processing, and to generate a reconstructed macroblock and a value of boundary strength corresponding to each edge of the reconstructed macroblock, the reconstructed macroblock being stored as a plurality of pixel words;
   a first and a second register array, each of the first and the second register array being configured to store pixels represented by a pixel word from among the plurality pixel words associated with the reconstructed macroblock; and
   an in-loop filtering acceleration circuit configured to select one of multiple 1D filters according to the value of the boundary strength that is associated with the pixels stored in the first and the second register array to filter the reconstructed macroblock by sequentially applying filtering to pixels contained within each of the plurality of pixel words representing the reconstructed macroblock by:
      dividing the reconstructed macroblock into multiple 8×8 blocks and multiple 4×4 blocks;
      filtering horizontal edges of the 8×8 blocks row by row from bottom to top, and applying the filter to horizontal edges of the 4×4 blocks row by row from top to bottom; and
      filtering vertical edges of the 8×8 blocks column by column from right to left, and filtering vertical edges of the 4×4 blocks column by column from left to right,
   wherein the first and the second register array store pixels associated with the reconstructed macroblock that are reused (i) to filter a current horizontal or vertical edge of the reconstructed macroblock, and (ii) to filter a subsequent horizontal or vertical edge of the reconstructed macroblock.

2. The video codec system as claimed in claim 1, wherein the 1D filters comprise multiple H.264 strong filters, multiple H.264 general filters, and a VC-1 filter, and the 1D filters are configured to filter horizontal edges or vertical edges of one of the 8×8 blocks.

3. The video codec system as claimed in claim 2,
   wherein when the value of boundary strength corresponding to an edge is 0, the in-loop filtering acceleration circuit does not filter;
   wherein when the value of boundary strength corresponding to the edge is between 1 to 3, the in-loop filtering acceleration circuit is configured to select the H.264 general filters to filter on the edge;
   wherein when the value of boundary strength corresponding to the edge is 4, in-loop filtering acceleration circuit is configured to select the H.264 strong filters to filter on the edge; and
   wherein when the value of boundary strength corresponding to the edge is 5, the in-loop filtering acceleration circuit is configured to select the VC-1 filter to filter on the edge.

4. The video codec system as claimed in claim 1, wherein the first and a second register array comprise respective transposition register arrays configured to transpose pixels of the reconstructed macroblock, so that the transposed pixels of the reconstructed macroblock are read by the 1D filters row by row or column by column.

5. The video codec system as claimed in claim 2, wherein the in-loop filtering acceleration circuit is further configured to:
   calculate multiple filter selection parameters according to pixels of the reconstructed macroblock; and
   select the 1D filter, wherein the selected 1D filter is one of the H.264 strong filters, the H.264 general filters and the VC-1 filter, the selection being according to the value of boundary strength, a luminance parameter, a clipping parameter, a bit rate parameter, and the calculated filter selection parameters.

6. An in-loop filtering method of a video codec system supporting an H.264 and a VC-1 video compression standard, the method comprising:
   video processing, by a video processor, to generate at least one reconstructed macroblock and a value of boundary strength corresponding to each edge of the reconstructed macroblock, the reconstructed macroblock being stored as a plurality of pixel words;
   storing, by a first and second register array, pixels represented by a pixel word from among the plurality pixel words associated with the reconstructed macroblock;
   filtering, by an accelerator circuit, wherein the filtering comprises:
      dividing the reconstructed macroblock into multiple 8×8 blocks and multiple 4×4 blocks;
      selecting one of multiple one-dimensional (1D) filters of the accelerator circuit according to the value of the boundary strength that is associated with the pixels stored in the first and the second register array, the 1D filter being selected to be used to sequentially apply filtering to pixels contained within each of the plurality of pixel words representing the reconstructed macroblock;
      filtering horizontal edges of the 8×8 blocks, row by row from down to up, and filtering horizontal edges of the 4×4 blocks row by row from top to bottom; and
      filtering vertical edges of the 8×8 blocks column by column from right to left, and filtering vertical edges of the 4×4 blocks column by column from left to right,
   wherein the first and the second register array store pixels associated with the reconstructed macroblock that are reused (i) to filter a current horizontal or vertical edge of the reconstructed macroblock, and (ii) to filter a subsequent horizontal or vertical edge of the reconstructed macroblock.

7. The in-loop filtering method as claimed in claim 6, wherein the 1D filters comprise multiple H.264 strong filers, multiple H.264 general filters, and a VC-1 filter.

8. The in-loop filtering method as claimed in claim 6, wherein the selection of one of the 1D filters according to the value of boundary strength further comprises:
   selecting the H.264 general filters when the value of boundary strength corresponding to the edge is between 1 to 3;
   selecting the H.264 strong filters when the value of boundary strength corresponding to the edge is 4; and
   selecting the VC-1 filter when the value of boundary strength corresponding to the edge is 5.

9. The in-loop filtering method as claimed in claim 7, further comprising:
   calculating multiple filter selection parameters according to pixels of the reconstructed macroblock; and
   selecting one 1D filter, wherein the selected 1D filter is one of the H.264 strong filters, the H.264 general filters and the VC-1 filter, the selection being according to the value of boundary strength, a luminance parameter, a clipping parameter, a bit rate parameter, and the calculated filter selection parameters.

10. The video codec system as claimed in claim 1, wherein the selection of the one of multiple 1D filters is repeatedly performed by evaluating the boundary strength associated with each of the plurality of pixel words and writing the filtered pixels to the first and the second register array until the filtering has been completed.

11. The video codec system as claimed in claim 3, wherein the in-loop filtering acceleration circuit is configured, when the value of boundary strength corresponding to the edge is between 1 and 5, to determine which specific filters are to be used in accordance with one of the H.264 general filters, the H.264 strong filters, and the VC-1 filter based upon parameters other than the boundary strength.

12. The video codec system as claimed in claim 11, wherein the in-loop filtering acceleration circuit is configured, when the selected filter type is the H.264 strong filters, to perform 1D filtering in accordance with specific H.264 filters from among the H.264 filters based upon different filter selection parameters exceeding a threshold value.

13. The video codec system as claimed in claim 11, wherein the in-loop filtering acceleration circuit is configured, when the selected filter type is the H.264 general filters, to perform 1D filtering in accordance with specific H.264 general filters from among the H.264 general filters based upon (i) different filter selection parameters exceeding a threshold value, and (ii) a chrominance parameter indicating that the reconstructed macroblock is a luminance macroblock.

14. The video codec system as claimed in claim 11, wherein the in-loop filtering acceleration circuit is configured, when the selected filter type is the VC-1 filter, to perform 1D filtering based upon a quantization parameter.

15. The video codec system as claimed in claim 1, wherein the storage of pixels in the first and the second register array facilitate filtering of the current and subsequent horizontal or vertical edge of the reconstructed macroblock without accessing a de-blocking filter buffer associated with the video codec system.

16. The in-loop filtering method as claimed in claim 6, wherein the selection of the one of multiple 1D filters is repeatedly performed by evaluating the boundary strength associated with each of the plurality of pixel words and writing the filtered pixels to the first and the second register array until the filtering has been completed.

17. The in-loop filtering method as claimed in claim 6, wherein the storage of pixels in the first and the second register array facilitate filtering of the current and subsequent horizontal or vertical edge of the reconstructed macroblock without accessing a de-blocking filter buffer associated with the video codec system.

* * * * *